US012645752B2

(12) United States Patent　　　　(10) Patent No.:　US 12,645,752 B2
Zhang et al.　　　　　　　　　　　(45) Date of Patent:　Jun. 2, 2026

(54) WINOGRAD CONVOLUTION OPERATION METHOD, APPARATUS, AND DEVICE, AND STORAGE MEDIUM

(71) Applicant: Cambricon Technologies Corporation Limited, Beijing (CN)

(72) Inventors: Yingnan Zhang, Beijing (CN); Hongbo Zeng, Beijing (CN); Yao Zhang, Beijing (CN); Shaoli Liu, Beijing (CN); Di Huang, Beijing (CN); Shiyi Zhou, Beijing (CN); Xishan Zhang, Beijing (CN); Chang Liu, Beijing (CN); Jiaming Guo, Beijing (CN); Yufeng Gao, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 1067 days.

(21) Appl. No.: 17/773,410

(22) PCT Filed: Sep. 3, 2020

(86) PCT No.: PCT/CN2020/113155
§ 371 (c)(1),
(2) Date: Apr. 29, 2022

(87) PCT Pub. No.: WO2021/082721
PCT Pub. Date: May 6, 2021

(65) Prior Publication Data
US 2022/0414183 A1　　Dec. 29, 2022

(30) Foreign Application Priority Data
Nov. 1, 2019　(CN) .......................... 201911061091.9

(51) Int. Cl.
*G06F 17/15*　　(2006.01)
*G06N 3/045*　　(2023.01)
*G06N 3/063*　　(2023.01)

(52) U.S. Cl.
CPC ........... *G06F 17/153* (2013.01); *G06N 3/045* (2023.01); *G06N 3/063* (2013.01)

(58) Field of Classification Search
CPC ........ G06F 17/153; G06F 17/16; G06N 3/063
See application file for complete search history.

(56) References Cited

U.S. PATENT DOCUMENTS

| 12,423,561 | B2 * | 9/2025 | Gong | .................... | G06N 3/0464 |
| 2017/0344876 | A1 * | 11/2017 | Brothers | ............... | G06F 17/153 |

(Continued)

FOREIGN PATENT DOCUMENTS

| CN | 108229656 A | 6/2018 |
| CN | 109388777 A | 2/2019 |

(Continued)

OTHER PUBLICATIONS

Lu, L. NPL: "SpWA: An Efficient Sparse Winograd Convolutional Neural Networks Accelerator on FPGAs". https://ieeexplore.ieee.org/document/8465842 (Year: 2018).*

(Continued)

*Primary Examiner* — Andrew Caldwell
*Assistant Examiner* — Carlos Heberto De La Garza
(74) *Attorney, Agent, or Firm* — Getech Law LLC; Jun Ye

(57)　　　　　ABSTRACT

The present disclosure provides a winograd convolution operation method, a winograd convolution operation apparatus, a device, and a storage medium. The apparatus includes: processors and a memory, where the memory is configured to store a program code, and the processors are configured to call the program code stored in the memory (Continued)

50

Winograd convolution operation apparatus

| 41 Splitting unit | 42 Transformation and summation operation unit | 43 Convolution operation unit |

| 51 Addition-execution-number determination unit | 52 Clock number determination unit | 53 Operation-sub-apparatus-number determination unit | and execute the operation method. Through the operation method, a system, the device and the storage medium of the present disclosure, performance loss of a computer system may be reduced, and operation speed may be improved. Through the present disclosure, processing efficiency may be improved.

16 Claims, 9 Drawing Sheets

(56) References Cited

U.S. PATENT DOCUMENTS

| | | | | |
|---|---|---|---|---|
| 2018/0189237 | A1* | 7/2018 | Werner | ................. G06F 17/153 |
| 2019/0042923 | A1* | 2/2019 | Janedula | ................. G06N 3/044 |
| 2020/0134400 | A1 | 4/2020 | Liu et al. | |

FOREIGN PATENT DOCUMENTS

| | | | |
|---|---|---|---|
| CN | 110097172 | A | 8/2019 |
| WO | 2018126073 | A1 | 7/2018 |
| WO | 2021082721 | A | 5/2021 |

OTHER PUBLICATIONS

PCT/CN2020/113155—International Search Report, mailed Nov. 30, 2020, 13 pages.
CN2019110610919—First Office Action mailed on Jun. 27, 2024, 12 pages.
EP20880805.5—Extended European Search Report, mailed on Dec. 12, 2022, 9 pages.

* cited by examiner

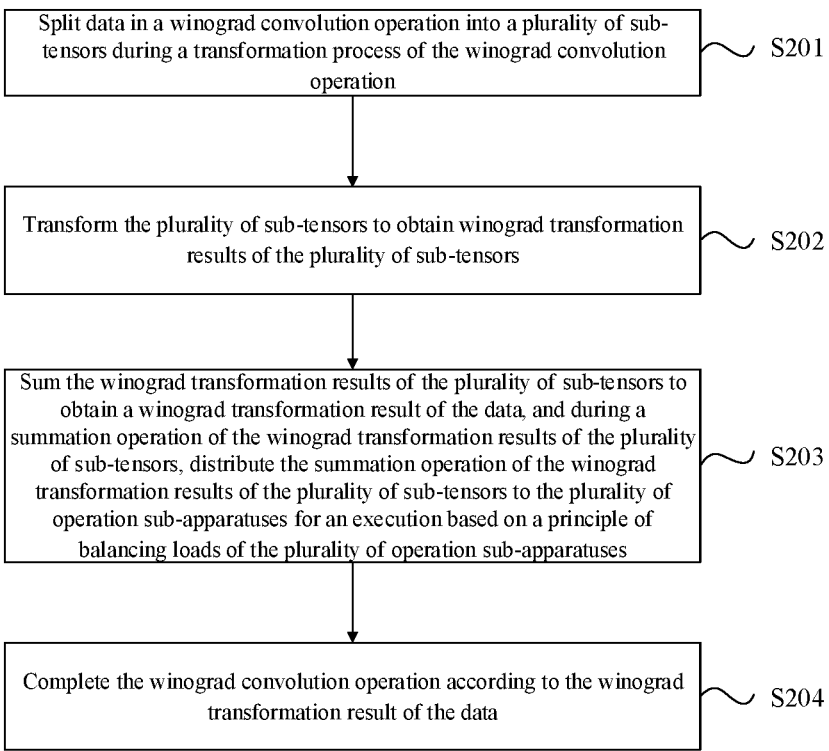

Split data in a winograd convolution operation into a plurality of sub-tensors during a transformation process of the winograd convolution operation    S201

Transform the plurality of sub-tensors to obtain winograd transformation results of the plurality of sub-tensors    S202

Sum the winograd transformation results of the plurality of sub-tensors to obtain a winograd transformation result of the data, and during a summation operation of the winograd transformation results of the plurality of sub-tensors, distribute the summation operation of the winograd transformation results of the plurality of sub-tensors to the plurality of operation sub-apparatuses for an execution based on a principle of balancing loads of the plurality of operation sub-apparatuses    S203

Complete the winograd convolution operation according to the winograd transformation result of the data    S204

FIG. 3

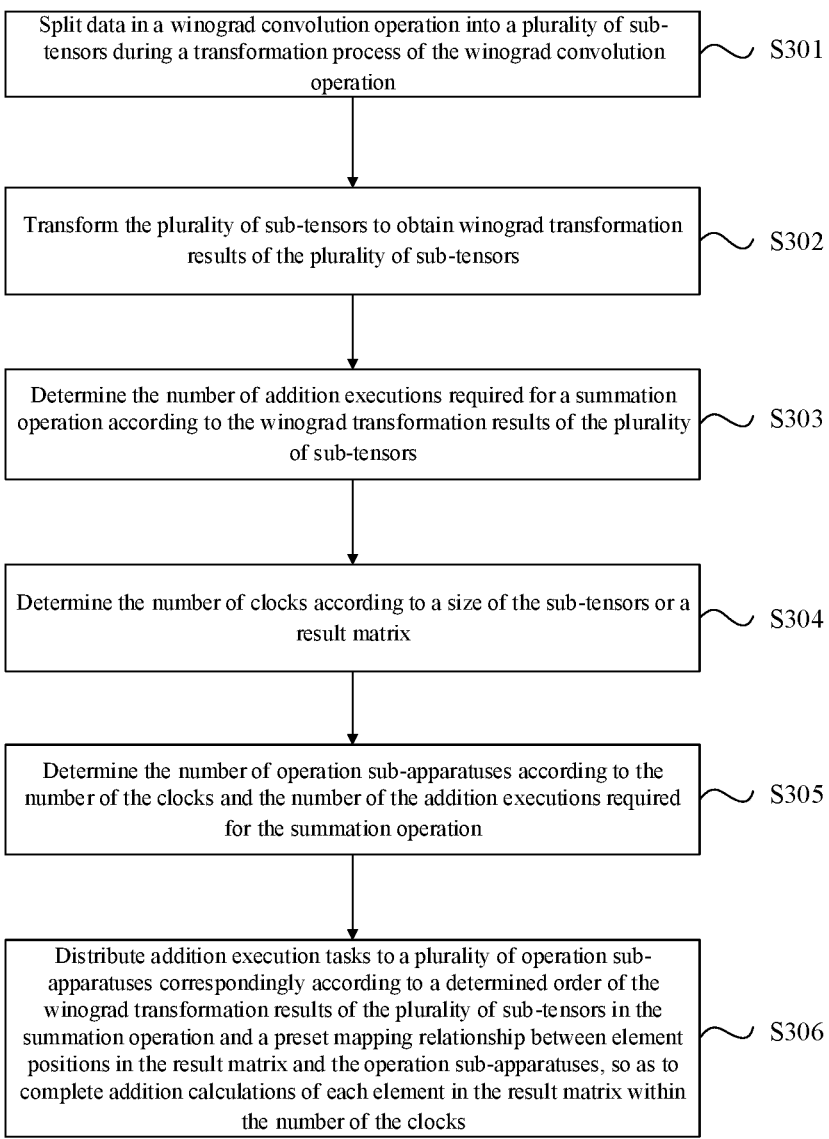

Split data in a winograd convolution operation into a plurality of sub-tensors during a transformation process of the winograd convolution operation    S301

Transform the plurality of sub-tensors to obtain winograd transformation results of the plurality of sub-tensors    S302

Determine the number of addition executions required for a summation operation according to the winograd transformation results of the plurality of sub-tensors    S303

Determine the number of clocks according to a size of the sub-tensors or a result matrix    S304

Determine the number of operation sub-apparatuses according to the number of the clocks and the number of the addition executions required for the summation operation    S305

Distribute addition execution tasks to a plurality of operation sub-apparatuses correspondingly according to a determined order of the winograd transformation results of the plurality of sub-tensors in the summation operation and a preset mapping relationship between element positions in the result matrix and the operation sub-apparatuses, so as to complete addition calculations of each element in the result matrix within the number of the clocks    S306

FIG. 4

WINOGRAD CONVOLUTION OPERATION METHOD, APPARATUS, AND DEVICE, AND STORAGE MEDIUM

CROSS-REFERENCE TO RELATED APPLICATIONS

This application is a national stage filing of International Application No. PCT/CN2020/113155, filed Sep. 3, 2020, which claims priority to Chinese patent application No. 201911061091.9 filed on Nov. 1, 2019 and entitled "WINOGRAD CONVOLUTION OPERATION METHOD, APPARATUS, AND DEVICE, AND STORAGE MEDIUM". The content of the applications are herein incorporated by reference in their entirety.

TECHNICAL FIELD

This disclosure relates to the technical field of artificial intelligence and in particular relates to a kind of winograd convolution operation method, apparatus, device, and storage medium.

BACKGROUND

With the development of artificial intelligence technologies, a convolution neural network model has emerged. The convolution neural network model is a kind of feed-forward neural network model that includes convolution calculations and a deep structure, and the convolution neural network model is one of representative models of deep learning. In the convolution neural network model, convolution operations on neurons and convolution kernels are required.

In the prior art, if the convolution operations are implemented by hardware, a large number of multipliers are required to be used on a chip. Since during an implementation process of hardware, overheads brought by multiplication implementations are much higher than that of addition implementations in terms of timing, power consumption and area, processing efficiency of the chip may be greatly reduced if the convolution operations are implemented by the hardware in the prior art.

SUMMARY

Based on this, in order to solve the technical problem above, the present disclosure provides a kind of winograd convolution operation method, apparatus, device, and storage medium.

A first aspect of embodiments of the present disclosure provides a winograd convolution operation method. The method may be applied to winograd convolution transformations, and the method may include:

splitting data in a winograd convolution operation into a plurality of sub-tensors during a transformation process of the winograd convolution operation;

transforming the plurality of sub-tensors to obtain winograd transformation results of the plurality of sub-tensors and summing the winograd transformation results of the plurality of sub-tensors to obtain a winograd transformation result of the data, where a summation operation of the winograd transformation results of the plurality of sub-tensors is completed by a plurality of operation sub-apparatuses based on set strategies; and completing the winograd convolution operation according to the winograd transformation result of the data.

A second aspect of embodiments of the present disclosure provides a winograd convolution operation apparatus, comprising:

a splitting unit configured to split data in a winograd convolution operation into a plurality of sub-tensors during a transformation process of the winograd convolution operation;

a transformation and summation operation unit configured to transform the plurality of sub-tensors to obtain winograd transformation results of the plurality of sub-tensors and sum the winograd transformation results of the plurality of sub-tensors to obtain a winograd transformation result of the data, where a summation operation of the winograd transformation results of the plurality of sub-tensors is completed by a plurality of operation sub-apparatuses based on set strategies; and a convolution operation unit configured to complete the winograd convolution operation according to the winograd transformation result of the data.

A third aspect of embodiments of the present disclosure provides a winograd convolution operation apparatus, including processors and a memory; where the memory is configured to store a program code; and the processors are configured to call the program code stored in the memory and execute the method of the first aspect.

A fourth aspect of embodiments of the present disclosure provides a computer-readable storage medium, on which an instruction is stored, where when run on a computer, the instruction enables the computer to execute the method of the first aspect.

A fifth aspect of embodiments of the present disclosure provides an artificial intelligence chip, including the apparatus of the second aspect or the third aspect.

A sixth aspect of embodiments of the present disclosure provides an electronic device, including the artificial intelligence chip of the fifth aspect.

A seventh aspect of embodiments of the present disclosure provides a board card, including a storage component, an interface apparatus, a control component and the artificial intelligence chip of the fifth aspect, where the artificial intelligence chip is connected to the storage component, the control component, and the interface apparatus, respectively;

the storage component is configured to store data;

the interface apparatus is configured to implement data transfer between the artificial intelligence chip and an external device; and the control component is configured to monitor a state of the artificial intelligence chip.

Further, in the board card above, the storage component may include: a plurality of groups of storage units, where each of the groups of storage units is connected to the artificial intelligence chip through a bus, and a storage unit is a double data rate (DDR) synchronous dynamic random access memory (SDRAM);

the chip may include: a DDR controller configured to control data transfer and data storage of each storage unit; and the interface apparatus is a standard peripheral component interconnect express (PCIe) interface.

The embodiments of the present disclosure provides a winograd convolution operation method, a winograd convolution operation apparatus, a device and a storage medium. According to the method, data in a winograd convolution operation is split into a plurality of sub-tensors;

the plurality of sub-tensors are transformed to obtain wino-grad transformation results of the plurality of sub-tensors, and the winograd transformation results of the plurality of sub-tensors are summed to obtain a winograd transformation result of the data, where a summation operation of the winograd transformation results of the plurality of sub-tensors is completed by a plurality of operation sub-appa-ratuses based on set strategies; and the winograd convolu-tion operation is completed according to the winograd transformation result of the data. Since an original transfor-mation process of the winograd convolution operation is changed from matrix multiplications to matrix summation operations, overheads brought by the multiplications may be reduced. In addition, since during the summation operation, the plurality of operation sub-apparatuses are used for processing, processing efficiency of a chip may be improved.

DESCRIPTION OF THE DRAWINGS

In order to illustrate technical solutions of embodiments of the present disclosure or the prior art more clearly, drawings required to be used in the description of the embodiments or the prior art will be introduced simply hereinafter.

FIG. 3 is a flowchart of a winograd convolution operation method, according to a second embodiment of the present disclosure.

FIG. 4 is a flowchart of a winograd convolution operation method, according to a third embodiment of the present disclosure.

DETAILED DESCRIPTION

Figure 1:
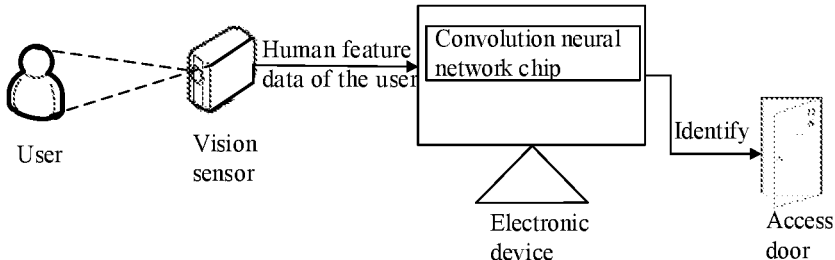
FIG. 1 is an application scenario diagram of a winograd convolution operation method, according to an embodiment of the present disclosure.

Technical solutions in embodiments of the present dis-closure will be described clearly and completely hereinafter with reference to drawings in the embodiments of the present disclosure. Obviously, the embodiments to be described are merely some of, but not all of the embodi-ments of the present disclosure. All other embodiments obtained by those of ordinary skill in the art based on the embodiments of the present disclosure without creative efforts shall fall within the protection scope of the present disclosure.

It should be understood that terms such as "first", "sec-ond", "third" and "fourth" in the claims, the specification, and the drawings are used for distinguishing different objects rather than describing a specific order. It should be understood that terms "including" and "comprising" used in the specification and the claims indicate the presence of a feature, an entity, a step, an operation, an element, and/or a component, but do not exclude the existence or addition of one or more other features, entities, steps, operations, ele-ments, components, and/or collections thereof.

It should also be understood that terms used in the specification of the present disclosure are merely for a purpose of describing a particular embodiment rather than limiting the present disclosure. As being used in the speci-fication and the claims of the disclosure, unless the context clearly indicates other conditions, singular forms "a", "an" and "the" are intended to include plural forms. It should also be understood that a term "and/or" used in the specification and the claims refers to any and all possible combinations of one or more of relevant listed items and includes these combinations.

As being used in this specification and the claims, a term "if" may be interpreted as "when", or "once" or "in response to a determination" or "in response to a case where some-thing is detected" depending on the context. By analogy, depending on the context, a clause "if it is determined that" or "if [a described condition or event] is detected" may be interpreted as "once it is determined that", or "in response to a determination", or "once [a described condition or event] is detected", or "in response to a case where [a described condition or event] is detected".

In order to make the technical solutions of the present disclosure to be clearly understood, technical terms involved in the prior art and the embodiments of the present disclo-sure are explained hereinafter.

Convolution operation: a convolution operation is to open an active window with the same size as a template starting from the upper left corner of an image, where the active window corresponds to a window image which is a convo-lution kernel, and multiply and then add the window image with corresponding pixels in the image, and use a calculation result as a first pixel value of a new image after the convolution operation. Then, the active window is moved one column to the right and the same operation is performed. And so on, from left to right and from top to bottom, the new image may be obtained.

Winograd convolution operation: a winograd convolution operation is a kind of convolution acceleration implemen-tation based on a polynomial interpolation algorithm. Dur-ing the winograd convolution operation, winograd convo-lution forward transformations are performed respectively on two inputs of a convolution operation, including a first target matrix and a second target matrix, and then the first target matrix after the forward transformation is multiplied with the second target matrix after the forward transforma-tion in an element-wise manner, and finally a winograd convolution inverse transformation is performed on an ele-ment-wise multiplication result again to obtain a convolu-tion result equivalent to an original convolution operation.

Convolution neural network model: a convolution neural network model is a kind of feed-forward neural network model that includes convolution calculations and a deep structure, and is one of representative models of deep learning. In network layers of the convolution neural net-work model, such as a convolution layer and a fully-connected layer, convolution operations on neurons and convolution kernels are required to be performed to obtain feature data. The convolution neural network model is widely applied to image classification, image identification, and the like Since matrix multiplications are still performed in the winograd convolution forward transformation and the winograd convolution inverse transformation, there are large overheads during a hardware implementation. Therefore, in order to further improve processing efficiency, the embodiments of the present disclosure provide a winograd convolution operation method. The winograd convolution operation method may be used in the hardware implementation of a convolution neural network.

Specifically, the winograd convolution operation method of the embodiments of the present disclosure may be used in various scenarios where the convolution neural network is used for identification, classification and prediction. For example, the winograd convolution operation method may be used in fields of autonomous driving, robotics, smart home, office management, and the like. FIG. 1 shows an application scenario of a winograd convolution operation method, according to the present disclosure. In the application scenario, an electronic device is equipped with a vision sensor and a convolution neural network chip. The vision sensor collects human feature data of a user, such as face data, iris data, and fingerprint data, and sends the human feature data to the electronic device. The electronic device identifies the human feature data through the convolution neural network chip. If the user is identified as a legitimate user, an access door will be opened; otherwise the access door will keep closed. Since the winograd convolution operation method of the embodiments of the present disclosure is used in the convolution neural network chip, data processing efficiency of the convolution neural network chip may be improved and the identification, classification and prediction may be performed quickly.

The embodiments of the present disclosure are described hereinafter with reference to the drawings.

Figure 2:
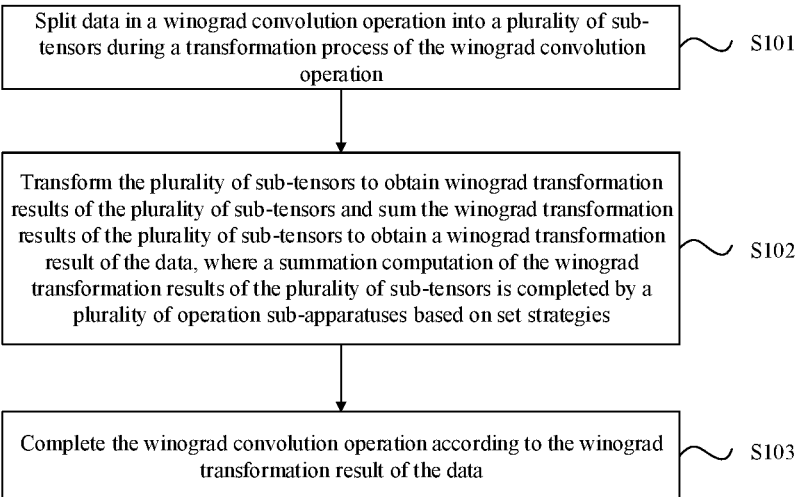
FIG. 2 is a flowchart of a winograd convolution operation method, according to a first embodiment of the present disclosure.

FIG. 2 is a flowchart of a winograd convolution operation method, according to a first embodiment of the present disclosure. As shown in FIG. 2, an execution subject of the embodiment is a winograd convolution operation apparatus, and the winograd convolution operation method of this embodiment includes the following steps.

In a step 101, during a transformation process of a winograd convolution operation, data in the winograd convolution operation is split into a plurality of sub-tensors.

A transformation type of the winograd convolution operation includes a winograd forward transformation and a winograd inverse transformation. If the transformation type of the winograd convolution operation is the winograd forward transformation, the data in the winograd convolution operation is neuron data or weight data, where the neuron data may be a neuron matrix and the weight data may be a weight matrix. If the transformation type of the winograd convolution operation is the winograd inverse transformation, the data in the winograd convolution operation is transformed element-wise multiplication data, where the transformed element-wise multiplication data is a transformed element-wise multiplication matrix, and the transformed element-wise multiplication matrix is a matrix formed after a result matrix after the neuron matrix is transformed forward is multiplied with a result matrix after the weight matrix is transformed forward in an element-wise manner.

The result matrix after the neuron matrix is transformed forward may be called a neuron-transformed matrix. The result matrix after the weight matrix is transformed forward may be called a weight-transformed matrix.

If the data is one-dimensional data, the winograd convolution operation may be expressed as $F=A^{T}((Gg)\odot(B^{T}d))$, and if the data is two-dimensional data, the winograd convolution operation may be expressed as $F=A^{T}((GgG^{T})\odot(B^{T}dB))A$ If the data is the one-dimensional data, F is a convolution output matrix, and d is first data, and $B^{r}$ is a transformation matrix of the winograd convolution forward transformation of the d, and g is second data, and G is the transformation matrix of the winograd convolution forward transformation of the g. Additionally, $(Gg)\odot(B^{T}d)$ is data formed after the first data after the forward transformation is multiplied with the second data after the forward transformation in the element-wise manner, which may be expressed as a transformed element-wise multiplication matrix and $A^{T}$ is the transformation matrix of the winograd convolution inverse transformation of the transformed element-wise multiplication matrix.

If the data is the two-dimensional data, F is the convolution output matrix, and d is the first data, which may be the neuron matrix, and $B^{T}$ is a left multiplication matrix of the winograd convolution forward transformation of the d, and B is a right multiplication matrix of the winograd convolution forward transformation of the d, and g is the second data, which may be the weight matrix, and G is the left multiplication matrix of the winograd convolution forward transformation of the g, and $G^{T}$ is the right multiplication matrix of the winograd convolution forward transformation of the g Additionally, $(GgG^{T})\odot(B^{T}dB)$ is the matrix formed after the first data after the forward transformation is multiplied with the second data after the forward transformation in the element-wise manner, which may be called the transformed element-wise multiplication matrix, and $A^{T}$ is the left multiplication matrix of the winograd convolution inverse transformation of the transformed element-wise multiplication matrix, and A is the right multiplication matrix of the winograd convolution inversion of the transformed element-wise multiplication matrix.

In this embodiment, the winograd convolution operation may include the winograd forward transformation and the winograd inverse transformation. And if the transformation type of the winograd convolution operation is the winograd forward transformation in this embodiment, the winograd forward transformation may be both the winograd forward transformation of the neuron matrix and the winograd forward transformation of the weight matrix. Moreover, this embodiment does not restrict a size of the data in the winograd convolution operation.

In this embodiment, if the data in the winograd convolution operation is split into the plurality of sub-tensors, the data may be parsed as a sum of the plurality of sub-tensors.

For example, the data may be represented as $$\begin{bmatrix} d_{00} & d_{01} & \ldots\ldots & d_{0Y} \\ d_{10} & d_{11} & \ldots\ldots & d_{1Y} \\ \ldots\ldots & \ldots\ldots & \ldots\ldots & \ldots\ldots \\ d_{X0} & d_{X1} & \ldots\ldots & d_{XY} \end{bmatrix},$$

and then the plurality of sub-tensors obtained after the data is split may be represented as follows:

$$\begin{bmatrix} d_{00} & 0 & \ldots\ldots & 0 \\ 0 & 0 & \ldots\ldots & 0 \\ \ldots\ldots & \ldots\ldots & \ldots\ldots & 0 \\ 0 & 0 & 0 & 0 \end{bmatrix}, \begin{bmatrix} 0 & d_{01} & \ldots\ldots & 0 \\ 0 & 0 & \ldots\ldots & 0 \\ \ldots\ldots & \ldots\ldots & \ldots\ldots & 0 \\ 0 & 0 & 0 & 0 \end{bmatrix}, \ldots,$$

-continued $$
\begin{bmatrix} 0 & 0 & \dots\dots & d_{0Y} \\ 0 & 0 & \dots\dots & 0 \\ \dots\dots & \dots\dots & \dots\dots & 0 \\ 0 & 0 & 0 & 0 \end{bmatrix},
$$

$$
\begin{bmatrix} 0 & 0 & \dots\dots & 0 \\ d_{10} & 0 & \dots\dots & 0 \\ \dots\dots & \dots\dots & \dots\dots & 0 \\ 0 & 0 & 0 & 0 \end{bmatrix}, \begin{bmatrix} 0 & 0 & \dots\dots & 0 \\ 0 & d_{11} & \dots\dots & 0 \\ \dots\dots & \dots\dots & \dots\dots & 0 \\ 0 & 0 & 0 & 0 \end{bmatrix},
$$

$$
\begin{bmatrix} 0 & 0 & \dots\dots & 0 \\ 0 & 0 & \dots\dots & d_{1Y} \\ \dots\dots & \dots\dots & \dots\dots & 0 \\ 0 & 0 & 0 & 0 \end{bmatrix}, \dots\dots,
$$

$$
\begin{bmatrix} 0 & 0 & \dots\dots & 0 \\ 0 & 0 & \dots\dots & 0 \\ \dots\dots & \dots\dots & \dots\dots & 0 \\ d_{X0} & 0 & 0 & 0 \end{bmatrix}, \begin{bmatrix} 0 & 0 & \dots\dots & 0 \\ 0 & 0 & \dots\dots & 0 \\ \dots\dots & \dots\dots & \dots\dots & 0 \\ 0 & d_{X1} & 0 & 0 \end{bmatrix}, \dots\dots,
$$

$$
\begin{bmatrix} 0 & 0 & \dots\dots & 0 \\ 0 & 0 & \dots\dots & 0 \\ \dots\dots & \dots\dots & \dots\dots & 0 \\ 0 & 0 & 0 & d_{XY} \end{bmatrix}.
$$

In a step 102, the plurality of sub-tensors are transformed to obtain the winograd transformation results of the plurality of sub-tensors, and the winograd transformation results of the plurality of sub-tensors are summed to obtain a winograd transformation result of the data, where a summation operation of the winograd transformation results of the plurality of sub-tensors is completed by a plurality of operation sub-apparatuses based on set strategies.

Specifically, in this embodiment, meta-tensors corresponding to the plurality of sub-tensors are obtained first and then winograd transformations of the meta-tensors are performed, and the winograd transformation results of the sub-tensors are determined according to the sub-tensors and the winograd transformation results of the meta-tensors. Then the summation operation of the winograd transformation results of the plurality of sub-tensors is completed by the plurality of operation sub-apparatuses based on the set strategies, and the winograd transformation result of the data is obtained.

The set strategies may be a load-balancing strategy. According to the strategy, if the summation operation of the winograd transformation results of the plurality of sub-tensors is performed by the plurality of operation sub-apparatuses, each operation sub-apparatus undertakes balanced addition execution tasks of elements in the result matrix.

In this embodiment, since the summation operation of the winograd transformation results of the plurality of sub-tensors is performed by the operation sub-apparatuses, the operation sub-apparatuses may be adders.

In a step 103, the winograd convolution operation is completed based on the winograd transformation result of the data.

In this embodiment, if the data is the two-dimensional data, the transformation result of the neuron matrix is determined first, and then the transformation result of the weight matrix is determined. Then, after the transformation result of the neuron matrix is multiplied with the transformation result of the weight matrix in the element-wise manner to obtain the transformed element-wise multiplication matrix, the transformation result of the element-wise multiplication matrix is determined, so as to complete the winograd convolution operation.

According to the winograd convolution operation method of this embodiment, the data in the winograd convolution operation is split into the plurality of sub-tensors; the plurality of sub-tensors are transformed to obtain the winograd transformation results of the plurality of sub-tensors, and the winograd transformation results of the plurality of sub-tensors are summed to obtain the winograd transformation result of the data, where the summation operation of the winograd transformation results of the plurality of sub-tensors is completed by the plurality of operation sub-apparatuses based on the set strategies; and the winograd convolution operation is completed according to the winograd transformation result of the data. Since an original transformation process of the winograd convolution operation is changed from a matrix multiplication to a matrix summation operation, overheads brought by the multiplication may be reduced. In addition, since the plurality of operation sub-apparatuses are involved in processing simultaneously during the summation operation, processing efficiency of a chip may be improved.

FIG. 3 is a flowchart of a winograd convolution operation method, according to a second embodiment of the present disclosure. As shown in FIG. 3, the winograd convolution operation method of this embodiment is a further refinement of the steps 101 to 103 based on the embodiment shown in FIG. 2. Then the winograd convolution operation method of this embodiment includes the following steps.

In a step 201, during a transformation process of a winograd convolution operation, data in the winograd convolution operation is split into a plurality of sub-tensors.

Further, in this embodiment, splitting the data in the winograd convolution operation into the plurality of sub-tensors includes:

parsing the data to obtain the plurality of sub-tensors, where the data is a sum of the plurality of sub-tensors, and the number of the plurality of sub-tensors is the same as the number of non-zero elements in the data, and each sub-tensor has a single non-zero element, and the non-zero elements in the sub-tensors are the same as the non-zero elements in corresponding positions in the data.

Specifically, assuming that the data is represented as $$
\begin{bmatrix} d_{00} & d_{01} & \dots\dots & d_{0Y} \\ d_{10} & d_{11} & \dots\dots & d_{1Y} \\ \dots\dots & \dots\dots & \dots\dots & \dots\dots \\ d_{X0} & d_{X1} & \dots\dots & d_{XY} \end{bmatrix},
$$

if each element in the data is a non-zero element, the plurality of sub-tensors obtained by splitting the data may be represented as follows:

$$
\begin{bmatrix} d_{00} & 0 & \dots\dots & 0 \\ 0 & 0 & \dots\dots & 0 \\ \dots\dots & \dots\dots & \dots\dots & 0 \\ 0 & 0 & 0 & 0 \end{bmatrix}, \begin{bmatrix} 0 & d_{01} & \dots\dots & 0 \\ 0 & 0 & \dots\dots & 0 \\ \dots\dots & \dots\dots & \dots\dots & 0 \\ 0 & 0 & 0 & 0 \end{bmatrix},
$$

$$
\dots\dots, \begin{bmatrix} 0 & 0 & \dots\dots & d_{0Y} \\ 0 & 0 & \dots\dots & 0 \\ \dots\dots & \dots\dots & \dots\dots & 0 \\ 0 & 0 & 0 & 0 \end{bmatrix},
$$

$$
\begin{bmatrix} 0 & 0 & \dots\dots & 0 \\ d_{10} & 0 & \dots\dots & 0 \\ \dots\dots & \dots\dots & \dots\dots & 0 \\ 0 & 0 & 0 & 0 \end{bmatrix}, \begin{bmatrix} 0 & 0 & \dots\dots & 0 \\ 0 & d_{11} & \dots\dots & 0 \\ \dots\dots & \dots\dots & \dots\dots & 0 \\ 0 & 0 & 0 & 0 \end{bmatrix},
$$

-continued $$
\begin{bmatrix} 0 & 0 & \dots & \dots & 0 \\ 0 & 0 & \dots & \dots & d_{1Y} \\ \dots & \dots & \dots & \dots & 0 \\ 0 & 0 & 0 & 0 \end{bmatrix}, \dots \dots , \begin{bmatrix} 0 & 0 & \dots & \dots & 0 \\ 0 & 0 & \dots & \dots & 0 \\ \dots & \dots & \dots & \dots & 0 \\ d_{X0} & 0 & 0 & 0 \end{bmatrix},
$$

$$
\begin{bmatrix} 0 & 0 & \dots & \dots & 0 \\ 0 & 0 & \dots & \dots & 0 \\ \dots & \dots & \dots & \dots & 0 \\ 0 & d_{X1} & 0 & 0 \end{bmatrix}, \dots \dots , \begin{bmatrix} 0 & 0 & \dots & \dots & 0 \\ 0 & 0 & \dots & \dots & 0 \\ \dots & \dots & \dots & \dots & 0 \\ 0 & 0 & 0 & d_{XY} \end{bmatrix}.
$$

The number of the plurality of sub-tensors is X*Y, and the number of the non-zero elements in the data is also X*Y. In other words, the number of the plurality of sub-tensors is the same as the number of the non-zero elements in the data. Besides, from the plurality of sub-tensors, it may be shown that each sub-tensor has the single non-zero element, and the non-zero elements in the sub-tensors are the same as the non-zero elements in the corresponding positions in the data.

In a step 202, the plurality of sub-tensors are transformed to obtain winograd transformation results of the plurality of sub-tensors.

Further, in this embodiment, the step 202 includes the following steps.

In a step 2021, a winograd transformation result of a meta-tensor corresponding to each sub-tensor is obtained.

The meta-tensor is a tensor that sets the non-zero element of a sub-tensor as 1.

Specifically, corresponding to the plurality of sub-tensors illustrated in the step 201, corresponding meta-tensors are denoted as follows respectively:

$$
\begin{bmatrix} 1 & 0 & \dots & \dots & 0 \\ 0 & 0 & \dots & \dots & 0 \\ \dots & \dots & \dots & \dots & 0 \\ 0 & 0 & 0 & 0 \end{bmatrix} \begin{bmatrix} 0 & 1 & \dots & \dots & 0 \\ 0 & 0 & \dots & \dots & 0 \\ \dots & \dots & \dots & \dots & 0 \\ 0 & 0 & 0 & 0 \end{bmatrix}, \dots \dots ,
$$

$$
\begin{bmatrix} 0 & 0 & \dots & \dots & 1 \\ 0 & 0 & \dots & \dots & 0 \\ \dots & \dots & \dots & \dots & 0 \\ 0 & 0 & 0 & 0 \end{bmatrix},
$$

$$
\begin{bmatrix} 0 & 0 & \dots & \dots & 0 \\ 1 & 0 & \dots & \dots & 0 \\ \dots & \dots & \dots & \dots & 0 \\ 0 & 0 & 0 & 0 \end{bmatrix} \begin{bmatrix} 0 & 0 & \dots & \dots & 0 \\ 0 & 1 & \dots & \dots & 0 \\ \dots & \dots & \dots & \dots & 0 \\ 0 & 0 & 0 & 0 \end{bmatrix},
$$

$$
\begin{bmatrix} 0 & 0 & \dots & \dots & 0 \\ 0 & 0 & \dots & \dots & 1 \\ \dots & \dots & \dots & \dots & 0 \\ 0 & 0 & 0 & 0 \end{bmatrix}, \dots \dots ,
$$

$$
\begin{bmatrix} 0 & 0 & \dots & \dots & 0 \\ 0 & 0 & \dots & \dots & 0 \\ \dots & \dots & \dots & \dots & 0 \\ 1 & 0 & 0 & 0 \end{bmatrix} \begin{bmatrix} 0 & 0 & \dots & \dots & 0 \\ 0 & 0 & \dots & \dots & 0 \\ \dots & \dots & \dots & \dots & 0 \\ 0 & 1 & 0 & 0 \end{bmatrix}, \dots \dots ,
$$

$$
\begin{bmatrix} 0 & 0 & \dots & \dots & 0 \\ 0 & 0 & \dots & \dots & 0 \\ \dots & \dots & \dots & \dots & 0 \\ 0 & 0 & 0 & 1 \end{bmatrix}.
$$

As an optional implementation, in a step 2021, the winograd transformation result of the meta-tensor corresponding to each sub-tensor is obtained, where specifically, for each sub-tensor, a left side of the meta-tensor corresponding to the sub-tensor is multiplied by a left multiplication matrix and a right side by a right multiplication matrix, so as to obtain the winograd transformation result of the meta-tensor.

Specifically, if the left multiplication matrix is denoted as and the right multiplication matrix is denoted as after the left side of the meta-tensor corresponding to each sub-tensor is multiplied by the left multiplication matrix and the right side by the right multiplication matrix, the obtained winograd transformation results of the meta-tensors may be denoted as follows respectively:

$$
B_{X \times X}^T \begin{bmatrix} 1 & 0 & \dots & \dots & 0 \\ 0 & 0 & \dots & \dots & 0 \\ \dots & \dots & \dots & \dots & 0 \\ 0 & 0 & 0 & 0 \end{bmatrix} B_{Y \times Y},
$$

$$
B_{X \times X}^T \begin{bmatrix} 0 & 1 & \dots & \dots & 0 \\ 0 & 0 & \dots & \dots & 0 \\ \dots & \dots & \dots & \dots & 0 \\ 0 & 0 & 0 & 0 \end{bmatrix} B_{Y \times Y}, \dots \dots ,
$$

$$
B_{X \times Y}^T \begin{bmatrix} 0 & 0 & \dots & \dots & 1 \\ 0 & 0 & \dots & \dots & 0 \\ \dots & \dots & \dots & \dots & 0 \\ 0 & 0 & 0 & 0 \end{bmatrix} B_{Y \times Y},
$$

$$
B_{X \times X}^T \begin{bmatrix} 0 & 0 & \dots & \dots & 0 \\ 1 & 0 & \dots & \dots & 0 \\ \dots & \dots & \dots & \dots & 0 \\ 0 & 0 & 0 & 0 \end{bmatrix} B_{Y \times Y},
$$

$$
B_{X \times X}^T \begin{bmatrix} 0 & 0 & \dots & \dots & 0 \\ 0 & 1 & \dots & \dots & 0 \\ \dots & \dots & \dots & \dots & 0 \\ 0 & 0 & 0 & 0 \end{bmatrix} B_{Y \times Y},
$$

$$
B_{X \times X}^T \begin{bmatrix} 0 & 0 & \dots & \dots & 0 \\ 0 & 0 & \dots & \dots & 1 \\ \dots & \dots & \dots & \dots & 0 \\ 0 & 0 & 0 & 0 \end{bmatrix} B_{Y \times Y}, \dots \dots ,
$$

$$
B_{X \times X}^T \begin{bmatrix} 0 & 0 & \dots & \dots & 0 \\ 0 & 0 & \dots & \dots & 0 \\ \dots & \dots & \dots & \dots & 0 \\ 1 & 0 & 0 & 0 \end{bmatrix} B_{Y \times Y},
$$

$$
B_{X \times X}^T \begin{bmatrix} 0 & 0 & \dots & \dots & 0 \\ 0 & 0 & \dots & \dots & 0 \\ \dots & \dots & \dots & \dots & 0 \\ 0 & 1 & 0 & 0 \end{bmatrix} B_{Y \times Y}, \dots \dots ,
$$

$$
B_{X \times X}^T \begin{bmatrix} 0 & 0 & \dots & \dots & 0 \\ 0 & 0 & \dots & \dots & 0 \\ \dots & \dots & \dots & \dots & 0 \\ 0 & 0 & 0 & 1 \end{bmatrix} B_{Y \times Y}.
$$

Both the left multiplication matrix and the right multiplication matrix are determined by a size of the sub-tensors and a type of winograd transformation, where the type of winograd transformation includes a winograd forward transformation and a winograd inverse transformation. In other words, if the size of the sub-tensors and the type of winograd transformation are fixed, each element in the left multiplication matrix and the right multiplication matrix will also be fixed.

In a step 2022, a non-zero element value of the sub-tensor is set as a coefficient to be multiplied by the winograd transformation result of a corresponding meta-tensor to obtain a winograd transformation result of the sub-tensor.

Further, in this embodiment, each sub-tensor has the non-zero element value, and a corresponding non-zero element value is obtained from each sub-tensor, and the non-zero element value is multiplied by the winograd transformation result of the corresponding meta-tensor to obtain the winograd transformation result of the sub-tensor.

Then the winograd transformation results of the sub-tensors that are listed above may be expressed as follows:

$$d_{00}B_{X\times X}^T\begin{bmatrix}1&0&\dots&0\\0&0&\dots&0\\\dots&\dots&\dots&0\\0&0&0&0\end{bmatrix}B_{Y\times Y},\ d_{01}B_{X\times X}^T\begin{bmatrix}0&1&\dots&0\\0&0&\dots&0\\\dots&\dots&\dots&0\\0&0&0&0\end{bmatrix}B_{Y\times Y},\ \dots\ ,$$

$$d_{0Y}B_{X\times X}^T\begin{bmatrix}0&0&\dots&1\\0&0&\dots&0\\\dots&\dots&\dots&0\\0&0&0&0\end{bmatrix}B_{Y\times Y},\ d_{10}B_{X\times X}^T\begin{bmatrix}0&0&\dots&0\\1&0&\dots&0\\\dots&\dots&\dots&0\\0&0&0&0\end{bmatrix}B_{Y\times Y},$$

$$d_{11}B_{X\times X}^T\begin{bmatrix}0&0&\dots&0\\0&1&\dots&0\\\dots&\dots&\dots&0\\0&0&0&0\end{bmatrix}B_{Y\times Y},\ d_{1Y}B_{X\times X}^T\begin{bmatrix}0&0&\dots&0\\0&0&\dots&1\\\dots&\dots&\dots&0\\0&0&0&0\end{bmatrix}B_{Y\times Y},\ \dots\ ,$$

$$d_{X0}B_{X\times X}^T\begin{bmatrix}0&0&\dots&0\\0&0&\dots&0\\\dots&\dots&\dots&0\\1&0&0&0\end{bmatrix}B_{Y\times Y},\ d_{X1}B_{X\times X}^T\begin{bmatrix}0&0&\dots&0\\0&0&\dots&0\\\dots&\dots&\dots&0\\0&1&0&0\end{bmatrix}B_{Y\times Y},\ \dots\ ,$$

$$d_{XY}B_{X\times X}^T\begin{bmatrix}0&0&\dots&0\\0&0&\dots&0\\\dots&\dots&\dots&0\\0&0&0&1\end{bmatrix}B_{Y\times Y}.$$

The winograd transformation result of the data may be expressed as:

$S=\text{Wino}\{d\}=B^T\ dB$. Then summing the winograd transformation results of the plurality of sub-tensors to obtain the winograd transformation result of the data maybe expressed as shown in a formula (1):

$$S=\text{Wino}\{d\}=B^T\ dB=d_{00}B_{X\times X}^T\begin{bmatrix}1&0&\dots\dots&0\\0&0&\dots\dots&0\\\dots\dots&\dots\dots&\dots\dots&0\\0&0&0&0\end{bmatrix}B_{Y\times Y}+ \tag{1}$$

$$\dots+d_{XY}B_{X\times X}^T\begin{bmatrix}0&0&0&0\\0&0&0&0\\0&0&0&0\\0&0&0&1\end{bmatrix}B_{Y\times Y}.$$

In a step 203, the winograd transformation results of the plurality of sub-tensors are summed to obtain the winograd transformation result of the data, and during a summation operation process of the winograd transformation results of the plurality of sub-tensors, the summation operation of the winograd transformation results of the plurality of sub-tensors is distributed to a plurality of operation sub-apparatuses for an execution based on a principle of balancing loads of the plurality of operation sub-apparatuses.

Further, in this embodiment, in the step 203, distributing the summation operation of the winograd transformation results of the plurality of sub-tensors to the plurality of operation sub-apparatuses for the execution based on the principle of balancing the loads of the plurality of operation sub-apparatuses includes the following steps.

In a step 2031, the number of the non-zero elements in a transformation matrix corresponding to each sub-tensor is determined.

Further, in this embodiment, a matrix formed by the winograd transformation result of each meta-tensor may be represented as the transformation matrix of a corresponding sub-tensor. Therefore, the number of the non-zero elements in the matrix corresponding to the winograd transformation result of the meta-tensor is determined as the number of the non-zero elements in the transformation matrix of the corresponding sub-tensor.

In a step 2032, an order of the winograd transformation results of the plurality of sub-tensors in the summation operation is determined according to the number of the non-zero elements.

Further, in this embodiment, in order to enable the plurality of operation sub-apparatuses to perform the summation operation of the winograd transformation results of the plurality of sub-tensors in a manner of load balancing, when the order of the winograd transformation results of the plurality of sub-tensors in the summation operation is determined, the winograd transformation results of the sub-tensors with the larger number of the non-zero elements should be matched with the winograd transformation results of the sub-tensors with the smaller number of the non-zero elements as much as possible for the summation operation, so that all the plurality of operation sub-apparatuses are involved in the summation operation within the same clock.

In a step 2033, addition execution tasks are distributed to the plurality of operation sub-apparatuses correspondingly according to the determined order of the winograd transformation results of the plurality of sub-tensors in the summation operation and a preset mapping relationship between element positions in the result matrix and operation sub-apparatuses.

The addition execution tasks are used to calculate each element in the result matrix.

Additive numbers in the addition execution tasks of the elements in the result matrix are composed of non-zero element values in data that is formed by the winograd transformation results of the plurality of sub-tensors.

The summation operation at the same element position in the result matrix is performed by the same operation sub-apparatus.

Further, in this embodiment, in order to enable the plurality of operation sub-apparatuses to complete addition calculations of the elements in the result matrix in the manner of load balancing, a mapping relationship between the element positions in the result matrix and the operation sub-apparatuses may be preset first based on the element positions of the non-zero elements of transformation matrixes in all the sub-tensors and the number of the operation sub-apparatuses. This mapping relationship indicates which operation sub-apparatus performs the summation operation at each element position in the result matrix. In other words, the same operation sub-apparatus performs the summation operation at the same element position in the result matrix. Then, according to the mapping relationship between the element positions in the result matrix and the operation sub-apparatuses and the determined order of the winograd transformation results of the plurality of sub-tensors in the summation operation, the addition execution tasks used to calculate the elements in the result matrix are distributed to the operation sub-apparatuses correspondingly, so as to enable the operation sub-apparatuses to complete the addition calculations of the elements in the result matrix in the manner of load balancing.

In a step 204, according to the winograd transformation result of the data, the winograd convolution operation is completed.

In this embodiment, an implementation of the step 204 is similar to that of the step 103 in embodiment one, which will not be repeated here.

According to the winograd convolution operation method of this embodiment, during the summation operation process of the winograd transformation results of the plurality of sub-tensors, the summation operation of the winograd transformation results of the plurality of sub-tensors are distributed to the plurality of operation sub-apparatuses correspondingly based on the principle of balancing the loads of the plurality of operation sub-apparatuses. This method not only enables the plurality of operation sub-apparatuses to be involved in processing simultaneously during the summation operation, which improves processing efficiency of a chip, but also achieves the load balancing among the plurality of operation sub-apparatuses during the summation operation.

FIG. 4 is a flowchart of a winograd convolution operation method, according to a third embodiment of the present disclosure. As shown in FIG. 4, the winograd convolution operation method of this embodiment is a further refinement of the step 203 based on the embodiment shown in FIG. 3, and then the winograd convolution operation method of this embodiment includes the following steps.

In a step 301, during a transformation process of a winograd convolution operation, data in the winograd convolution operation is split into a plurality of sub-tensors.

In a step 302, the plurality of sub-tensors are transformed to obtain winograd transformation results of the plurality of sub-tensors.

In this embodiment, implementations of the step 301 and the step 302 are similar to those of the step 201 and the step 202 in the embodiment shown in FIG. 3, which will not be repeated here.

In a step 303, the number of addition executions required for a summation operation is determined according to the winograd transformation results of the plurality of sub-tensors.

Further, in this embodiment, since each operation sub-apparatus may perform one operation per clock during a hardware implementation of the winograd convolution operation, after a forward or an inverse transformation of the data in the winograd convolution operation is added and split according to a formula (1), the number of addition executions is much more than that of multiplication executions. In order to match addition execution tasks and multiplication execution tasks in term of computing power in the winograd convolution operation, the operation sub-apparatuses for multiplication tasks may also perform the matched multiplication tasks if the operation sub-apparatuses for addition tasks complete the addition tasks, and therefore, in this embodiment, it is necessary to determine the number of clocks required to calculate a summation result and determine the number of the addition executions required to calculate the summation result, so that the operation sub-apparatuses may complete the addition execution tasks within the number of the clocks.

Specifically, in this embodiment, transformation matrixes corresponding to the winograd transformation results of the plurality of sub-tensors include elements with zero element values and elements with non-zero element values. The summation operation of the winograd transformation results of the sub-tensors is related to the non-zero element values in each transformation matrix. Therefore, the number of the addition executions required to calculate the summation result may be determined according to the number of the non-zero element values in the transformation matrixes corresponding to the winograd transformation results of the plurality of sub-tensors and a size of a result matrix.

As an optional implementation, the step 303 includes the following steps.

In a step 3031, a non-zero element value at a same element position in data that is formed by a winograd transformation result of each sub-tensor is determined as an additive number of the element position in the result matrix.

In a step 3032, the number of summation operations at each element position is determined based on the additive number of each element position in the result matrix.

In a step 3033, a sum of the number of the summation operations at each element position is determined as the number of the addition executions required to calculate the summation result.

The data that is formed by the winograd transformation result of each sub-tensor may be in the form of a corresponding matrix.

Further, in this embodiment, since during the summation operation of the winograd transformation results of the plurality of sub-tensors, element values at the same position in a matrix that is formed by the winograd transformation result of each sub-tensor are summed to be used as a value of the element position in the result matrix, while in the matrix that is formed by the winograd transformation result of the sub-tensor, there are several element positions whose element values are zero, and therefore, the non-zero element value at the same element position in the matrix that is formed by the winograd transformation result of each sub-tensor may be determined as the additive number at the element position in the result matrix. However, since a difference between the number of additive numbers at each element position and the number of the summation operations performed at the element position is 1, a difference between the number of the additive numbers at each element position in the result matrix and 1 may be determined as the number of the summation operations at each element position. The sum of the number of the summation operations at all element positions may be determined as the number of the addition executions required to calculate the summation result.

In order to facilitate understanding, a size of data in the winograd convolution operation may be set as 4×4 as an example for explanation. For data d with a size of 4×4, corresponding winograd transformation results of the plurality of sub-tensors may be expressed as shown in a formula (2). The matrix that is formed by the winograd transformation results of the plurality of sub-tensors may be expressed as shown in a formula (3). A size of a corresponding result matrix S is 4×4. In other words, the result matrix has 16 elements, which may be expressed as shown in a formula (4).

Then the corresponding winograd transformation results of the plurality of sub-tensors may be expressed as:

$$
d_{00}{:}d_{00} * \begin{bmatrix} 1 & 0 & 0 & 0 \\ 0 & 0 & 0 & 0 \\ 0 & 0 & 0 & 0 \\ 0 & 0 & 0 & 0 \end{bmatrix}, \quad d_{01}{:}d_{01} * \begin{bmatrix} 0 & 1 & -1 & 1 \\ 0 & 0 & 0 & 0 \\ 0 & 0 & 0 & 0 \\ 0 & 0 & 0 & 0 \end{bmatrix}
$$

$$
d_{10}{:}d_{10} * \begin{bmatrix} 0 & 0 & 0 & 0 \\ 1 & 0 & 0 & 0 \\ -1 & 0 & 0 & 0 \\ 1 & 0 & 0 & 0 \end{bmatrix}, \quad d_{11}{:}d_{11} * \begin{bmatrix} 0 & 0 & 0 & 0 \\ 0 & 1 & -1 & 1 \\ 0 & -1 & 1 & -1 \\ 0 & 1 & -1 & 1 \end{bmatrix}
$$

$$
d_{02}{:}d_{02} * \begin{bmatrix} -1 & 1 & 1 & 0 \\ 0 & 0 & 0 & 0 \\ 0 & 0 & 0 & 0 \\ 0 & 0 & 0 & 0 \end{bmatrix}, \quad d_{03}{:}d_{03} * \begin{bmatrix} 0 & 0 & 0 & -1 \\ 0 & 0 & 0 & 0 \\ 0 & 0 & 0 & 0 \\ 0 & 0 & 0 & 0 \end{bmatrix}
$$

(2).

-continued $$d_{12}{:}d_{12}* \begin{bmatrix} 0 & 0 & 0 & 0 \\ -1 & 1 & 1 & 0 \\ 1 & -1 & -1 & 0 \\ -1 & 1 & 1 & 0 \end{bmatrix}, d_{13}{:}d_{13}* \begin{bmatrix} 0 & 0 & 0 & 0 \\ 0 & 0 & 0 & -1 \\ 0 & 0 & 0 & 1 \\ 0 & 0 & 0 & -1 \end{bmatrix}$$

$$d_{S-20}{:}d_{S-20}* \begin{bmatrix} -1 & 0 & 0 & 0 \\ 1 & 0 & 0 & 0 \\ 1 & 0 & 0 & 0 \\ 0 & 0 & 0 & 0 \end{bmatrix}, d_{21}{:}d_{21}* \begin{bmatrix} 0 & -1 & 1 & -1 \\ 0 & 1 & -1 & 1 \\ 0 & 1 & -1 & 1 \\ 0 & 0 & 0 & 0 \end{bmatrix}$$

$$d_{30}{:}d_{30}* \begin{bmatrix} 0 & 0 & 0 & 0 \\ 0 & 0 & 0 & 0 \\ 0 & 0 & 0 & 0 \\ -1 & 0 & 0 & 0 \end{bmatrix}, d_{31}{:}d_{31}* \begin{bmatrix} 0 & 0 & 0 & 0 \\ 0 & 0 & 0 & 0 \\ 0 & 0 & 0 & 0 \\ 0 & -1 & 1 & -1 \end{bmatrix}$$

$$d_{22}{:}d_{22}* \begin{bmatrix} 1 & -1 & -1 & 0 \\ -1 & 1 & 1 & 0 \\ -1 & 1 & 1 & 0 \\ 0 & 0 & 0 & 0 \end{bmatrix}, d_{23}{:}d_{23}* \begin{bmatrix} 0 & 0 & 0 & 1 \\ 0 & 0 & 0 & -1 \\ 0 & 0 & 0 & -1 \\ 0 & 0 & 0 & 0 \end{bmatrix}$$

$$d_{32}{:}d_{32}* \begin{bmatrix} 0 & 0 & 0 & 0 \\ 0 & 0 & 0 & 0 \\ 0 & 0 & 0 & 0 \\ 1 & -1 & -1 & 0 \end{bmatrix}, d_{33}{:}d_{33}* \begin{bmatrix} 0 & 0 & 0 & 0 \\ 0 & 0 & 0 & 0 \\ 0 & 0 & 0 & 0 \\ 0 & 0 & 0 & 1 \end{bmatrix}.$$

The corresponding matrix that is formed by the winograd transformation results of the plurality of sub-tensors may be expressed as:

$$d_{00}{:} \begin{bmatrix} d_{00} & 0 & 0 & 0 \\ 0 & 0 & 0 & 0 \\ 0 & 0 & 0 & 0 \\ 0 & 0 & 0 & 0 \end{bmatrix}, d_{01}{:} \begin{bmatrix} 0 & d_{01} & -d_{01} & d_{01} \\ 0 & 0 & 0 & 0 \\ 0 & 0 & 0 & 0 \\ 0 & 0 & 0 & 0 \end{bmatrix}$$

$$d_{10}{:} \begin{bmatrix} 0 & 0 & 0 & 0 \\ d_{10} & 0 & 0 & 0 \\ -d_{10} & 0 & 0 & 0 \\ d_{10} & 0 & 0 & 0 \end{bmatrix}, d_{11}{:} \begin{bmatrix} 0 & 0 & 0 & 0 \\ 0 & d_{11} & -d_{11} & d_{11} \\ 0 & -d_{11} & d_{11} & -d_{11} \\ 0 & d_{11} & -d_{11} & 1 & d_{11} \end{bmatrix}$$

$$d_{02}{:} \begin{bmatrix} -d_{02} & d_{02} & d_{02} & 0 \\ 0 & 0 & 0 & 0 \\ 0 & 0 & 0 & 0 \\ 0 & 0 & 0 & 0 \end{bmatrix}, d_{03}{:} \begin{bmatrix} 0 & 0 & 0 & -d_{03} \\ 0 & 0 & 0 & 0 \\ 0 & 0 & 0 & 0 \\ 0 & 0 & 0 & 0 \end{bmatrix}$$

$$d_{12}{:} \begin{bmatrix} 0 & 0 & 0 & 0 \\ -d_{12} & d_{12} & d_{12} & 0 \\ d_{12} & -d_{12} & -d_{12} & 0 \\ -d_{12} & d_{12} & d_{12} & 0 \end{bmatrix}, d_{13}{:} \begin{bmatrix} 0 & 0 & 0 & 0 \\ 0 & 0 & 0 & -d_{13} \\ 0 & 0 & 0 & d_{13} \\ 0 & 0 & 0 & -d_{13} \end{bmatrix},$$

$$d_{20}{:} \begin{bmatrix} -d_{20} & 0 & 0 & 0 \\ d_{20} & 0 & 0 & 0 \\ d_{20} & 0 & 0 & 0 \\ 0 & 0 & 0 & 0 \end{bmatrix}, d_{21}{:} \begin{bmatrix} 0 & -d_{21} & d_{21} & -d_{21} \\ 0 & d_{21} & -d_{21} & d_{21} \\ 0 & d_{21} & -d_{21} & d_{21} \\ 0 & 0 & 0 & 0 \end{bmatrix}$$

$$d_{30}{:} \begin{bmatrix} 0 & 0 & 0 & 0 \\ 0 & 0 & 0 & 0 \\ 0 & 0 & 0 & 0 \\ -d_{30} & 0 & 0 & 0 \end{bmatrix}, d_{31}{:} \begin{bmatrix} 0 & 0 & 0 & 0 \\ 0 & 0 & 0 & 0 \\ 0 & 0 & 0 & 0 \\ 0 & -d_{31} & d_{31} & -d_{31} \end{bmatrix}$$

$$d_{22}{:} \begin{bmatrix} d_{22} & -d_{22} & -d_{22} & 0 \\ -d_{22} & d_{22} & d_{22} & 0 \\ -d_{22} & d_{22} & d_{22} & 0 \\ 0 & 0 & 0 & 0 \end{bmatrix}, d_{23}{:} \begin{bmatrix} 0 & 0 & 0 & d_{23} \\ 0 & 0 & 0 & -d_{23} \\ 0 & 0 & 0 & -d_{23} \\ 0 & 0 & 0 & 0 \end{bmatrix}$$

$$d_{32}{:} \begin{bmatrix} 0 & 0 & 0 & 0 \\ 0 & 0 & 0 & 0 \\ 0 & 0 & 0 & 0 \\ d_{32} & -d_{32} & -d_{32} & 0 \end{bmatrix}, d_{33}{:} \begin{bmatrix} 0 & 0 & 0 & 0 \\ 0 & 0 & 0 & 0 \\ 0 & 0 & 0 & 0 \\ 0 & 0 & 0 & d_{33} \end{bmatrix} \qquad (3)$$

The result matrix S may be expressed as:

$$\begin{bmatrix} S_{00} & S_{01} & \ldots \ldots & S_{03} \\ S_{10} & S_{11} & \ldots \ldots & S_{13} \\ \ldots \ldots & \ldots \ldots & \ldots \ldots & \ldots \ldots \\ S_{30} & S_{31} & S_{32} & S_{33} \end{bmatrix}, \qquad (4).$$

Firstly, the non-zero element value at the same element position in the matrix that is formed by the winograd transformation results of the plurality of sub-tensors is determined as the additive number at the element position in the result matrix. For example, the additive number at $S_{00}$ is 4, which comes from the winograd transformation results of the plurality of sub-tensors of $d_{00}$, $d_{02}$, $d_{20}$, $d_{22}$, respectively. The additive number at $S_{01}$ is 4, which comes from the winograd transformation results of the plurality of sub-tensors of $d_{01}$, $d_{02}$, $d_{21}$, $d_{21}$, respectively. Similarly, the additive numbers at other element positions of the result matrix are all 4.

Next, the number of the summation operations at each element position is determined based on the additive number at each element position in the result matrix. Since the additive number at each element position in the result matrix is 4, the number of the summation operations at each element position is 3.

Finally, the sum of the number of the summation operations at each element position is determined as the number of the addition executions required to calculate the summation result. Since the number of the summation operations at each element position in the result matrix is 3 and there are 16 element positions in the result matrix, the total number of the summation operations at each element position is 48. In other words, the number of the addition executions required to calculate the summation result is 48.

In a step 304, the number of clocks is determined based on a size of the sub-tensors or the result matrix.

The result matrix is a matrix after a winograd convolution forward transformation or a winograd convolution inverse transformation is performed, such as in the formula (4), the result matrix S after the winograd convolution forward transformation is performed.

When the number of the clocks used to calculate the summation result is determined, in order to match the addition execution tasks and the multiplication execution tasks in term of computing power, the number of the clocks required for the multiplication execution tasks is determined as the number of the clocks required for the addition execution tasks.

Optionally, if the winograd convolution transformation is the winograd convolution forward transformation, the number of the clocks required for the multiplication execution tasks is the same as the size of the result matrix. If the winograd convolution transformation is the winograd convolution inverse transformation, the number of the clocks required for the multiplication execution tasks is the same as a size of a transformed element-wise multiplication matrix, which in turn is the same as a size of corresponding sub-tensors, so if the winograd convolution transformation is the winograd convolution inverse transformation, the number of the clocks required for the multiplication execution tasks is the same as the size of the sub-tensors.

In other words, if the winograd convolution transformation is the winograd convolution forward transformation, the size of the result matrix is X×Y, and the determined number of the clocks used to calculate the summation result is X×Y If the winograd convolution transformation is the winograd convolution inverse transformation, the size of the sub-tensors is X×Y, and the determined number of the clocks used to calculate the summation result is X×Y.

As an optional implementation, determining the number of the clocks according to the size of the sub-tensors or the result matrix includes:

determining a maximum size of the sub-tensors and the
        result matrix; and determining the number of the clocks
        according to the maximum size.

If the winograd convolution transformation is the winograd convolution forward transformation, the number of the clocks required for the multiplication execution tasks is the same as the size of the result matrix corresponding to a neuron matrix or the size of the result matrix corresponding to a weight matrix in the winograd convolution operation. If the winograd convolution transformation is the winograd convolution inverse transformation, the number of the clocks required for the multiplication execution tasks is the same as the size of the transformation element-wise matrix, which is a matrix corresponding to data of the winograd convolution inverse transformation. Moreover, the size of the matrix corresponding to the data of the winograd convolution inverse transformation is equal to the size of the sub-tensors of the data, so if the winograd convolution transformation is the winograd convolution inverse transformation, the number of the clocks required for the multiplication execution tasks is equal to the size of the sub-tensors of the data. Since the winograd convolution forward transformation and the winograd convolution inverse transformation are corresponding, the maximum size of the sub-tensors in the winograd convolution transformation and the corresponding result matrix may be determined as the number of the clocks used to calculate the summation result.

In a step 305, the number of the operation sub-apparatuses is determined according to the number of the clocks and the number of the addition executions required for the summation operation.

Further, in this embodiment, the step 305 includes the following steps.

In a step 3051, a ratio of the number of the addition executions required to calculate the summation result to the number of the clocks used to calculate the summation result is calculated.

In a step 3052, based on the ratio, the number of the operation sub-apparatuses is determined, where the number of the operation sub-apparatuses is greater than the ratio.

Further, if the number of the addition executions required to calculate the summation result is expressed as NumAdd, the number of the clocks used by the summation result is expressed as NumClk, and the number of the operation sub-apparatuses is expressed as NumUnit, the determined number of the operation sub-apparatuses may be expressed as NumUnit>NumAdd/NumClk.

If the size of the result matrix is 4×4, the number of the addition executions is 48, and the number of the clocks used by the summation result is 16, then the number of the operation sub-apparatuses may be greater than 3, such as 4.

In this embodiment, the number of the operation sub-apparatuses is set to a value that is greater than the ratio of the number of the addition executions required for the summation result to the number of the clocks used by the summation result, so that addition calculations of elements in the result matrix may be completed within the number of the clocks. If the number of the operation sub-apparatuses is set to a value which is slightly greater than the ratio, all the operation sub-apparatuses may be controlled to be in a processing state within each clock, and finally the addition calculations of the elements in the result matrix may be completed within the number of the clocks.

In a step 306, the addition execution tasks are distributed to the plurality of operation sub-apparatuses correspondingly according to the determined order of the winograd transformation results of the plurality of sub-tensors in the summation operation and a preset mapping relationship between element positions in the result matrix and the plurality of operation sub-apparatuses, so as to complete the addition calculations of the elements in the result matrix within the number of the clocks.

The addition execution tasks are used to calculate each element in the result matrix.

Further, in this embodiment, after the number of the addition executions required for the summation operation and the number of the clocks and the number of the operation sub-apparatuses are determined, by distributing the addition execution tasks to the plurality of operation sub-apparatuses correspondingly according to the determined order of the winograd transformation results of the plurality of sub-tensors in the summation operation and the preset mapping relationship between the element positions in the result matrix and the operation sub-apparatuses, not only load balancing may be realized when the summation operation is performed among the plurality of operation sub-apparatuses, but also completing the addition calculations of the elements in the result matrix within the number of the clocks may be ensured. If the number of the operation sub-apparatuses is set to a value that is slightly larger than the ratio, all the operation sub-apparatuses may be controlled to be in the processing state within each clock.

Therefore, as an optional implementation, in the step 306, distributing the addition execution task used to calculate each element in the result matrix to the plurality of operation sub-apparatuses correspondingly to complete the addition calculations of the elements in the result matrix within the preset number of the clocks includes the following steps.

In a step 3061, within first N consecutive clocks, one of additive numbers used to calculate each element position in the result matrix is input to a corresponding operation sub-apparatus to perform an initial assignment on each element in the result matrix.

In a step 3062, within the remaining clocks, the remaining additive numbers used to calculate each element position in the result matrix are input to corresponding operation sub-apparatuses for the addition calculations until each element value in the result matrix is obtained.

All the operation sub-apparatuses are in the processing state within each clock.

Further, in this embodiment, firstly, the number of first consecutive clocks required to input the one of additive numbers required to calculate each element position in the result matrix to the corresponding operation sub-apparatus may be determined based on the number of the elements of the result matrix and the number of the operation sub-apparatuses. The number of the first consecutive clocks N is a ratio of the number of the elements of the result matrix to the number of the operation sub-apparatuses.

If the size of the result matrix is X×Y, and the number of the elements of the result matrix is also X×Y, and the number of the operation sub-apparatuses is t, and then the number of the first consecutive clocks is N=(X×Y)/t.

Then, within each clock of the first N consecutive clocks, the one of additive numbers used to calculate n element positions in the result matrix may be input to the corresponding operation sub-apparatus to perform the initial assignment on the elements at the n element positions in the result matrix, where the number of n is the same as the number of the operation sub-apparatuses. In other words, each operation unit performs the initial assignment on a corresponding element in the result matrix within a same clock. After the first N consecutive clocks, the plurality of the operation sub-apparatuses perform the initial assignment on all elements in the result matrix.

It may be understood that each operation sub-apparatus may include registers, and the number of the registers may be the same as the number of the element positions corresponding to the operation sub-apparatus, so that each register may store the additive number of the corresponding element position or each addition operation result. After the first N consecutive clocks, the registers corresponding to the operation sub-apparatuses store the one of the additive numbers of the corresponding element positions.

It should be noted that the one of additive numbers that is input to the operation sub-apparatus for calculating each element position in the result matrix is derived from the non-zero element in the matrix that is formed by the winograd transformation results of the plurality of sub-tensors in the formula (3). When the one of additive numbers used to calculate each element position in the result matrix is input to the corresponding operation sub-apparatus, an input order of the matrix that is formed by the winograd transformation results of the plurality of sub-tensors is required to ensure that within each clock, each operation sub-apparatus may be in a state of initially assigning the elements in the corresponding element position in the result matrix.

Finally, within each clock of the remaining clocks, each operation sub-apparatus receives one remaining additive number used to calculate the corresponding element position in the result matrix, and the operation sub-apparatus adds the remaining additive number received this time and the additive number stored in a register and stores a result of the addition operation in a corresponding register again. Until the operation sub-apparatus receives a last remaining additive number used to calculate the corresponding element position in the result matrix and the addition operation on the last remaining additive number and the result of the addition operation in the register is performed, the element values of the element positions in the result matrix are obtained.

It should be noted that the remaining additive numbers that are input to the operation sub-apparatuses for calculating the element positions in the result matrix are also derived from the non-zero elements in the matrix that is formed by the winograd transformation results of the plurality of sub-tensors. Therefore, when the remaining additive numbers used to calculate the element positions in the result matrix are input to the corresponding operation apparatuses, the input order of the matrix that is formed by the winograd transformation results of the plurality of sub-tensors is also required to ensure that each operation sub-apparatus within each clock is in the state of performing the addition operation on the elements in the corresponding element position in the result matrix.

In this optional implementation, within each clock of the first N consecutive clocks, all the operation sub-apparatuses are in the state of initially assigning the elements at the corresponding element positions in the result matrix. Within each clock of the remaining clocks, all the operation sub-apparatuses are in the state of performing the addition operations on the elements of the corresponding element positions in the result matrix.

In this embodiment, when the addition execution tasks used to calculate each element in the result matrix are distributed to the plurality of operation sub-apparatuses correspondingly to complete the addition calculations of the elements in the result matrix within the preset number of the clocks, the one of the additive numbers used to calculate each element position in the result matrix is input to the corresponding operation apparatus within the first N consecutive clocks to initially assign each element in the result matrix. Within the remaining clocks, the remaining additive numbers used to calculate the element positions in the result matrix are input to the corresponding operation sub-apparatuses for the addition calculations until each element value in the result matrix is obtained. This embodiment provides a first method of controlling each operation sub-apparatus to be in the processing state within each clock and performing the addition operation at the same element position in the result matrix by the same operation sub-apparatus, which may ensure that the plurality of operation sub-apparatuses are in the processing state within all clocks, thereby further improving an execution speed of a chip during the winograd convolution transformation and further improving processing efficiency of the chip.

As another optional implementation, the step 306 includes the following steps.

In a step 306a, the number of the clocks is divided into a plurality of clock segments, and each element position in the result matrix is divided into a plurality of element position sets, where the clock segments correspond to the element position sets one to one.

Optionally, in this embodiment, the number of the clocks is averagely divided into the plurality of clock segments based on the number of the operation sub-apparatuses. For the result matrix with a size of 4×4, the number of the clocks is 16, and the number of the operation sub-apparatuses is 4, and then the divided clock segments are 4 segments.

Optionally, in this embodiment, a plurality of element positions in the result matrix are averagely divided into the plurality of element position sets based on the number of the elements in the result matrix and the number of the operation sub-apparatuses. For each divided element position set, the operation sub-apparatuses corresponding to the element positions are required to be different to ensure that all the operation sub-apparatuses are in the processing state within each clock.

Since the number of the elements in the result matrix is the same as the number of the clocks, the number of the element position sets is the same as the number of the clock segments. Moreover, the clock segments correspond to the element positions sets one to one. In other words, it is possible to complete the addition operations of the element positions in the corresponding element position sets by the plurality of operation sub-apparatuses within one clock segment.

In a step 306b, for each element position set, within a first clock of a corresponding clock segment, the one of additive numbers used to calculate all element positions in that element position set is input to the corresponding operation sub-apparatus to initially assign the element positions in that element position set; within the remaining clocks of the clock segment, the remaining additive numbers used to calculate all element positions in each element position set are input to the corresponding operation sub-apparatuses to perform the addition operations until the each element value in that element position set is obtained.

All the operation sub-apparatuses are in the processing state within each clock.

Further, in this embodiment, when the addition execution tasks used to calculate each element in the result matrix are distributed to the operation sub-apparatuses correspondingly according to the clock segment and the element position set corresponding to the clock segment.

It should be noted that each operation sub-apparatus includes the registers, and the number of the registers is the same as the number of the element positions corresponding to the operation sub-apparatus.

Specifically, in a first clock segment, calculation tasks of a first element position set are distributed to each operation sub-apparatus. In the first clock of the first clock segment, the one of additive numbers used to calculate all element positions in the element position set is input to the corresponding operation sub-apparatus, and after the initial assignment of each element position in the element position set is performed by the operation sub-apparatus, the additive number is stored in a first register For each clock within the remaining clocks of the clock segment, the one remaining additive number used to calculate all element positions in each element position set is input to the corresponding operation sub-apparatus, and the addition calculation is performed on the stored additive number obtained from the first register and the remaining additive number, and so on until the operation sub-apparatuses complete the addition operations of the corresponding element positions in the element position set. Then addition operation results corresponding to the element positions in the first element position set are stored in the first register of each operation sub-apparatus.

By analogy, in a M-th clock segment, the calculation tasks of a M-th element position set are distributed to each operation sub-apparatus. In the first clock of the M-th clock segment, the one of additive numbers used to calculate all element positions in the element position set is input to the corresponding operation sub-apparatus. After the initial assignment of each element position in the element position set is performed, the additive number is stored in a corresponding M-th register. For each clock within the remaining clocks of the clock segment, the one remaining additive number used to calculate all element positions in each element position set is input to the corresponding operation sub-apparatus, and the addition calculation on the stored additive number obtained from the M-th register and the remaining additive number is performed, and so on until the operation apparatuses complete the addition operations of the corresponding element positions in the element position set. Then, the results of the addition operations of the corresponding element positions in the M-th element position set are stored in the M-th register of each operation sub-apparatus.

Finally, each element value in each element position set is obtained from the corresponding register, and the result matrix is obtained according to the preset mapping relationship between the element positions in the result matrix and the operation sub-apparatuses.

According to the winograd convolution operation method of this embodiment, when the addition execution tasks are distributed to the plurality of operation sub-apparatuses correspondingly to complete the addition calculations of the elements in the result matrix within the preset number of the clocks, the number of the clocks is divided into the plurality of clock segments, and each element position in the result matrix is divided into the plurality of element position sets, where the clock segments correspond to the element position sets one to one; for each element position set, within the first clock of the corresponding clock segment, the one of additive numbers used to calculate all element positions in the element position set is input to the corresponding operation sub-apparatus to initially assign the element positions in the element position set; within the remaining clocks of the clock segment, the remaining additive numbers used to calculate all element positions in each element position set are input to the corresponding operation sub-apparatuses for the addition calculations until each element value in the element position set is obtained. This embodiment provides a second method of controlling each operation sub-apparatus to be in the processing state within each clock and performing the addition operation at the same element position in the result matrix by the same operation sub-apparatus, which may ensure that the plurality of operation sub-apparatuses are in the processing state within all clocks, thereby further improving the execution speed of the chip during the winograd convolution transformation and further improving the processing efficiency of the chip.

In the case that the data in the winograd convolution operation is the neuron matrix, the weight matrix and the transformed element-wise multiplication matrix respectively, the summation operation of the winograd transformation results of the plurality of sub-tensors by the plurality of operation sub-apparatuses is illustrated below. A size of the neuron matrix is 4×4, 4×3, 3×4, 3×3, 4×1, 1×4, 3×1, 1×3, respectively, and a size of the weight matrix is 3×3, 3×2, 2×3, 2×2, 3×1, 1×3, 2×1, 1×2, respectively, and a size of the transformed element-wise multiplication matrix is 2×2, 2×2, 2×2, 2×2, 2×1, 1×2, 2×1, 1×2 correspondingly.

For the matrix with a neuron matrix size of 4×4, a matrix multiplication between a neuron matrix d and matrixes $B^T$ and B of the winograd convolution forward transformation is expressed as shown in a formula (5):

$$(5)$$

$$S = Wino\{d\} = B_{4\times4}^T d_{4\times4}$$

$$B_{4\times4} = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \begin{bmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{bmatrix} \begin{bmatrix} 1 & 0 & 0 & 0 \\ 0 & 1 & -1 & 1 \\ -1 & 1 & 1 & 0 \\ 0 & 0 & 0 & -1 \end{bmatrix}.$$

Transforming the plurality of sub-tensors to obtain the winograd transformation results of the plurality of sub-tensors maybe expressed as shown in the formula (2):

Due to the winograd convolution forward transformation of the neuron matrix, based on the size of the result matrix, the number of the clocks used to calculate the summation result is determined as 4×4=16. When the number of the addition executions required to calculate the summation result is determined based on the winograd transformation results of the plurality of sub-tensors, since the additive numbers of the element positions in the result matrix are 4, the number of the summation operations at each element position in the result matrix is 3, and the sum of the number of the summation operations at each element position in the result matrix is 48 and the number of the addition executions required to calculate the summation result is 48.

A determining method for the number of the addition executions required to calculate the summation result is essentially the same as a determining method for the difference between the number of the non-zero elements in the matrix that is formed by the winograd transformation results of all the plurality of sub-tensors and the size of the result matrix. Therefore, for the matrix with a result matrix size of 4×4, the number of the addition executions required to calculate the summation result is determined as: 1*4+3*8+9*4−4*4=48.

1*4 means that the number of matrixes that are formed by the winograd transformation results of the sub-tensors with only 1 non-zero element is 4; 3*8 means that the number of matrixes that are formed by the winograd transformation results of the sub-tensors with 3 non-zero elements is 8; 9*4 means that the number of matrixes that are formed by the winograd transformation results of the sub-tensors with 9 non-zero elements is 4; and 4*4 is the size of the result matrix.

Based on the number of the clocks and the number of the addition executions required, the number of the operation sub-apparatuses is determined to be greater than 3. Since for the matrix with the neuron matrix size of 4×4, 4 operation sub-apparatuses may complete the addition calculations of the elements in the result matrix within 16 clocks, the number of the operation sub-apparatuses is 4. The 4 operation sub-apparatuses are numbered 0-3, and the operation sub-apparatuses corresponding to each element position in the result matrix are represented as shown in Table 1.

TABLE 1

| For a Neuron Matrix Size of 4 × 4, Operation Units Corresponding to Each Element in a Result Matrix with a Size of 4 × 4 | | | |
|---|---|---|---|
| 0 | 2 | 1 | 3 |
| 2 | 2 | 1 | 1 |
| 3 | 3 | 0 | 0 |
| 1 | 3 | 0 | 2 |

For the winograd convolution forward transformation with the neuron matrix size of 4×4, according to the mapping relationship between the element positions in the result matrix and the operation sub-apparatuses in Table 1, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $d_{11} \rightarrow d_{01} \rightarrow d_{10} \rightarrow d_{00} \rightarrow d_{12} \rightarrow d_{03} \rightarrow d_{02} \rightarrow d_{13} \rightarrow d_{22} \rightarrow d_{30} \rightarrow d_{21} \rightarrow d_{31} \rightarrow d_{23} \rightarrow d_{33} \rightarrow d_{23} \rightarrow d_{32}$, so as to ensure that all the operation sub-apparatuses are in the processing state within each clock.

Then during the 16 clocks, within the first 4 consecutive clocks, 4 operation units input the one of additive numbers used to calculate each element position in the result matrix to the corresponding operation sub-apparatus to initially assign each element in the result matrix, where the 4 operation sub-apparatuses are in the state of performing the initial assignment within the 4 consecutive clocks. Within the remaining 12 clocks, the remaining additive numbers used to calculate each element position in the result matrix are input to the corresponding operation apparatuses for the addition calculations until each element value in the result matrix is obtained, where the operation sub-apparatuses are in the state of performing the summation operation within the 12 clocks.

It may be understood that after the element values in the result matrix are obtained, the element values may be sequentially output to other components, such as a main processing memory, so that the result matrix may be stored by the other components.

For the matrix d with a neuron matrix size of 4×3, the matrix multiplication between the neuron matrix and the matrixes $B^T$ B of the winograd convolution forward transformation is expressed as shown in a formula (6):

$$S = Wino\{d\} = \qquad\qquad (6)$$

$$B_{4\times4}^T d_{4\times3} B_{3\times3} = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \begin{bmatrix} d_{00} & d_{01} & d_{02} \\ d_{10} & d_{11} & d_{12} \\ d_{20} & d_{21} & d_{22} \\ d_{30} & d_{31} & d_{32} \end{bmatrix} \begin{bmatrix} 1 & 0 & 0 \\ -1 & 1 & -1 \\ 0 & 0 & 1 \end{bmatrix}.$$

Transforming the plurality of sub-tensor to obtain the winograd transformation results of the plurality of sub-tensors may be expressed as shown in a formula (7):

$$d_{00}{:}d_{00}* \begin{bmatrix} 1 & 0 & 0 \\ 0 & 0 & 0 \\ 0 & 0 & 0 \\ 0 & 0 & 0 \end{bmatrix}, d_{01}{:}d_{01}* \begin{bmatrix} -1 & 1 & -1 \\ 0 & 0 & 0 \\ 0 & 0 & 0 \\ 0 & 0 & 0 \end{bmatrix}, d_{02}{:}d_{02}* \begin{bmatrix} 0 & 0 & 1 \\ 0 & 0 & 0 \\ 0 & 0 & 0 \\ 0 & 0 & 0 \end{bmatrix} \quad (7)$$

$$d_{10}{:}d_{10}* \begin{bmatrix} 0 & 0 & 0 \\ 1 & 0 & 0 \\ -1 & 0 & 0 \\ 1 & 0 & 0 \end{bmatrix}, d_{11}{:}d_{11}* \begin{bmatrix} 0 & 0 & 0 \\ -1 & 1 & -1 \\ 1 & -1 & 1 \\ -1 & 1 & -1 \end{bmatrix}, d_{12}{:}d_{12}* \begin{bmatrix} 0 & 0 & 0 \\ 0 & 0 & 1 \\ 0 & 0 & -1 \\ 0 & 0 & 1 \end{bmatrix}$$

$$d_{20}{:}d_{20}* \begin{bmatrix} -1 & 0 & 0 \\ 1 & 0 & 0 \\ 1 & 0 & 0 \\ 0 & 0 & 0 \end{bmatrix}, d_{21}{:}d_{21}* \begin{bmatrix} 1 & -1 & 1 \\ -1 & 1 & -1 \\ -1 & 1 & -1 \\ 0 & 0 & 0 \end{bmatrix}, d_{22}{:}d_{22}* \begin{bmatrix} 0 & 0 & -1 \\ 0 & 0 & 1 \\ 0 & 0 & 1 \\ 0 & 0 & 0 \end{bmatrix}$$

$$d_{30}{:}d_{30}* \begin{bmatrix} 0 & 0 & 0 \\ 0 & 0 & 0 \\ 0 & 0 & 0 \\ -1 & 0 & 0 \end{bmatrix}, d_{31}{:}d_{31}* \begin{bmatrix} 0 & 0 & 0 \\ 0 & 0 & 0 \\ 0 & 0 & 0 \\ 1 & -1 & 1 \end{bmatrix}, d_{32}{:}d_{32}* \begin{bmatrix} 0 & 0 & 0 \\ 0 & 0 & 0 \\ 0 & 0 & 0 \\ 0 & 0 & -1 \end{bmatrix}.$$

Due to the winograd convolution forward transformation of the neuron matrix, based on the size of the result matrix, the number of the clocks used to calculate the summation result is determined as 4×3=12. The number of the addition executions required to calculate the summation result is determined as 1*4+3*6+9*2−4*3=28.

1*4 means that the number of the matrixes that are formed by the winograd transformation results of the sub-tensors with only 1 non-zero element is 4; 3*6 means that the number of the matrixes that are formed by the winograd transformation result of the sub-tensors with 3 non-zero elements is 6; 9*2 means that the number of the matrixes that are formed by the winograd transformation results of the sub-tensors with 9 non-zero elements is 2; and 4*3 is the size of the result matrix.

Based on the number of the clocks and the number of the addition executions required, the number of the operation sub-apparatuses is determined as 4. The 4 operation sub-apparatuses are numbered 0-3, and the operation sub-apparatuses corresponding to each element position in the result matrix are shown in Table 2.

For the winograd convolution forward transformation with the neuron matrix size of 4×3, according to the mapping relationship between the element positions in the result matrix and the operation sub-apparatuses in Table 2, the summation operation at the same element position in the result matrix may be performed by the same operation sub-apparatus, and when the addition execution tasks used to calculate each element in the result matrix are distributed to the operation sub-apparatuses correspondingly, the matrixes that are formed by the winograd transformation results of the sub-tensors are read in an order of $d_{11} \rightarrow d_{01} \rightarrow d_{10} \rightarrow d_{00} \rightarrow d_{12} \rightarrow d_{02} \rightarrow d_{21} \rightarrow d_{31} \rightarrow d_{20} \rightarrow d_{30} \rightarrow d_{22} \rightarrow d_{33}$, so as to ensure that all operation sub-apparatuses are in the processing state within each clock.

TABLE 2

For a Neuron Matrix Size of 4 × 3, Operation Sub-apparatuses Corresponding to Each Element Position in a Result Matrix with a Size of 4 × 3

| | | |
|---|---|---|
| 0 | 0 | 0 |
| 1 | 1 | 1 |
| 2 | 2 | 2 |
| 3 | 3 | 3 |

Then during the 12 clocks, within the first 3 consecutive clocks, the 4 operation units input the one of additive numbers used to calculate each element position in the result matrix to the corresponding operation sub-apparatus to initially assign each element in the result matrix, where the operation sub-apparatuses are in the state of performing the initial assignment within the 3 consecutive clocks. Within the remaining 9 clocks, the remaining additive numbers used to calculate the element positions in the result matrix are input to the corresponding operation sub-apparatuses for the addition calculations until each element value in the result matrix is obtained, where the operation sub-apparatuses are in the state of performing the summation operation within the 9 clocks.

It may be understood that after the element values in the result matrix are obtained, the element values may be sequentially output to the other components, such as the master processing memory, so that the result matrix may be stored by the other components.

For the matrix d with a neuron matrix size of 3×4, the matrix multiplication between the neuron matrix and the matrixes $B^T$ and $B$ of the winograd convolution forward transformation is expressed as shown in a formula (8):

$$S = Wino\{d\} =$$

$$B^T_{3 \times 3} d_{3 \times 4} B_{4 \times 4} = \begin{bmatrix} 1 & -1 & 0 \\ 0 & 1 & 0 \\ 0 & -1 & 1 \end{bmatrix} \begin{bmatrix} d_{00} & d_{01} & d_{02} & d_{03} \\ d_{10} & d_{11} & d_{12} & d_{13} \\ d_{20} & d_{21} & d_{22} & d_{23} \end{bmatrix} \begin{bmatrix} 1 & 0 & 0 & 0 \\ 0 & 1 & -1 & 1 \\ -1 & 1 & 1 & 0 \\ 0 & 0 & 0 & -1 \end{bmatrix}. \quad (8)$$

Transforming the plurality of sub-tensors to obtain the winograd transformation results of the plurality of sub-tensors may be expressed as shown in a formula (9):

$$d_{00}{:}d_{00} * \begin{bmatrix} 1 & 0 & 0 \\ 0 & 0 & 0 \\ 0 & 0 & 0 \\ 0 & 0 & 0 \end{bmatrix}^T, d_{10}{:}d_{10} * \begin{bmatrix} -1 & 1 & -1 \\ 0 & 0 & 0 \\ 0 & 0 & 0 \\ 0 & 0 & 0 \end{bmatrix}^T, d_{20}{:}d_{20} * \begin{bmatrix} 0 & 0 & 1 \\ 0 & 0 & 0 \\ 0 & 0 & 0 \\ 0 & 0 & 0 \end{bmatrix}^T \quad (9)$$

$$d_{01}{:}d_{01} * \begin{bmatrix} 0 & 0 & 0 \\ 1 & 0 & 0 \\ -1 & 0 & 0 \\ 1 & 0 & 0 \end{bmatrix}^T, d_{11}{:}d_{11} * \begin{bmatrix} 0 & 0 & 0 \\ -1 & 1 & -1 \\ 1 & -1 & 1 \\ -1 & 1 & -1 \end{bmatrix}^T, d_{21}{:}d_{21} * \begin{bmatrix} 0 & 0 & 0 \\ 0 & 0 & 1 \\ 0 & 0 & -1 \\ 0 & 0 & 1 \end{bmatrix}^T$$

-continued $$d_{02}{:}d_{02} * \begin{bmatrix} -1 & 0 & 0 \\ 1 & 0 & 0 \\ 1 & 0 & 0 \\ 0 & 0 & 0 \end{bmatrix}^T, d_{12}{:}d_{12} * \begin{bmatrix} 1 & -1 & 1 \\ -1 & 1 & -1 \\ -1 & 1 & -1 \\ 0 & 0 & 0 \end{bmatrix}^T, d_{22}{:}d_{22} * \begin{bmatrix} 0 & 0 & -1 \\ 0 & 0 & 1 \\ 0 & 0 & 1 \\ 0 & 0 & 0 \end{bmatrix}^T$$

$$d_{03}{:}d_{03} * \begin{bmatrix} 0 & 0 & 0 \\ 0 & 0 & 0 \\ 0 & 0 & 0 \\ -1 & 0 & 0 \end{bmatrix}^T, d_{13}{:}d_{13} * \begin{bmatrix} 0 & 0 & 0 \\ 0 & 0 & 0 \\ 0 & 0 & 0 \\ 1 & -1 & 1 \end{bmatrix}^T, d_{23}{:}d_{23} * \begin{bmatrix} 0 & 0 & 0 \\ 0 & 0 & 0 \\ 0 & 0 & 0 \\ 0 & 0 & -1 \end{bmatrix}^T.$$

Due to the winograd convolution forward transformation of the neuron matrix, based on the size of the result matrix, the number of the clocks used to calculate the summation result is determined as 3×4=12. The number of the addition executions required to calculate the summation result is determined as 1*4+3*6+9*2−3*4=28.

1*4 means that the number of the matrixes that are formed by the winograd transformation results of the sub-tensors with only 1 non-zero element is 4; 3*6 means that the number of the matrixes that are formed by the winograd transformation results of the sub-tensors with 3 non-zero elements is 6; 9*2 means that the number of the matrixes that are formed by the winograd transformation results of the sub-tensors with 9 non-zero elements is 2; and 3*4 is the size of the result matrix.

Based on the number of the clocks and the number of the addition executions required, the number of the operation sub-apparatuses is determined as 4. The 4 operation sub-apparatuses are numbered 0-3, and the operation sub-apparatuses corresponding to each element position in the result matrix are shown in Table 3.

TABLE 3

For a Neuron Matrix Size of 3 × 4, Operation Sub-apparatuses Corresponding to Each Element Position in a Result Matrix with a Size of 3 × 4

| | | | |
|---|---|---|---|
| 0 | 1 | 2 | 3 |
| 0 | 1 | 2 | 3 |
| 0 | 1 | 2 | 3 |

For the winograd convolution forward transformation with the neuron matrix size of 3×4, according to the mapping relationship between the element positions in the result matrix and the operation sub-apparatuses in Table 3, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $d_{11} \rightarrow d_{10} \rightarrow d_{01} \rightarrow d_{00} \rightarrow d_{21} \rightarrow d_{20} \rightarrow d_{12} \rightarrow d_{13} \rightarrow d_{02} \rightarrow d_{03} \rightarrow d_{22} \rightarrow d_{23}$, so as to ensure that all operation sub-apparatuses are in the processing state within each clock and the summation operation at the same element position in the result matrix is performed by the same operation sub-apparatus.

During the 12 clocks, within the first 3 consecutive clocks, the 4 operation units input the one of additive numbers used to calculate each element position in the result matrix to the corresponding operation sub-apparatus to initially assign each element in the result matrix, where the operation sub-apparatuses are in the state of performing the initial assignment within the 3 consecutive clocks. Within the remaining 9 clocks, the remaining additive numbers used to calculate each element position in the result matrix are input to the corresponding operation sub-apparatuses for the addition calculations until each element value in the result matrix is obtained, where the operation sub-apparatuses are in the state of performing the summation operation within the 9 clocks.

It may be understood that after the element values in the result matrix are obtained, the element values may be output sequentially to the other components, such as the master processing memory, so that the result matrix may be stored by the other components.

For the matrix d with a neuron matrix size of 3×3, the matrix multiplication between the neuron matrix and winograd convolution forward transformation matrixes is expressed as shown in a formula (10):

$$S = Wino\{d\} = B_{3\times3}^T d_{3\times3} B_{3\times3} = \begin{bmatrix} 1 & -1 & 0 \\ 0 & 1 & 0 \\ 0 & -1 & 1 \end{bmatrix} \begin{bmatrix} d_{00} & d_{01} & d_{02} \\ d_{10} & d_{11} & d_{12} \\ d_{20} & d_{21} & d_{22} \end{bmatrix} \begin{bmatrix} 1 & 0 & 0 \\ -1 & 1 & -1 \\ 0 & 0 & 1 \end{bmatrix}$$

(10).

In this formula, both $B^T$ an B are the winograd convolution forward transformation matrixes.

Transforming the plurality of sub-tensors to obtain the winograd transformation results of the plurality of sub-tensors may be expressed as shown in a formula (11).

$$d_{00}: d_{00} * \begin{bmatrix} 1 & 0 & 0 \\ 0 & 0 & 0 \\ 0 & 0 & 0 \end{bmatrix}^T, d_{01}: d_{01} * \begin{bmatrix} -1 & 1 & -1 \\ 0 & 0 & 0 \\ 0 & 0 & 0 \end{bmatrix}^T, d_{02}: d_{02} * \begin{bmatrix} 0 & 0 & 1 \\ 0 & 0 & 0 \\ 0 & 0 & 0 \end{bmatrix}^T \quad (11)$$

$$d_{10}: d_{10} * \begin{bmatrix} -1 & 0 & 0 \\ 1 & 0 & 0 \\ -1 & 0 & 0 \end{bmatrix}^T,$$

$$d_{11}: d_{11} * \begin{bmatrix} 1 & -1 & 1 \\ -1 & 1 & -1 \\ 1 & -1 & 1 \end{bmatrix}^T, d_{12}: d_{12} * \begin{bmatrix} 0 & 0 & -1 \\ 0 & 0 & 1 \\ 0 & 0 & -1 \end{bmatrix}^T$$

$$d_{20}: d_{20} * \begin{bmatrix} 0 & 0 & 0 \\ 0 & 0 & 0 \\ 1 & 0 & 0 \end{bmatrix}^T, d_{21}: d_{21} * \begin{bmatrix} 0 & 0 & 0 \\ 0 & 0 & 0 \\ -1 & 1 & -1 \end{bmatrix}^T, d_{22}: d_{22} * \begin{bmatrix} 0 & 0 & 0 \\ 0 & 0 & 0 \\ 0 & 0 & 1 \end{bmatrix}^T.$$

Due to the winograd convolution forward transformation of the neuron matrix, based on the size of the result matrix, the number of the clocks used to calculate the summation result is determined as 3×3=9. The number of the addition executions required to calculate the summation result is determined as 1*4+3*4+9*3*3=16.

1*4 means that the number of the matrixes that are formed by the winograd transformation results of the sub-tensors with only 1 non-zero element is 4; 3*4 means that the number of the matrixes that are formed by the winograd transformation results of the sub-tensors with 3 non-zero elements is 4; 9*1 means that the number of the matrixes that are formed by the winograd transformation results of the sub-tensors with 9 non-zero elements is 1; and 3*3 is the size of the result matrix.

Based on the number of the clocks and the number of the addition executions required, the number of the operation sub-apparatuses is determined as 4. The 4 operation sub-apparatuses are numbered 0-3, and the operation sub-apparatuses corresponding to each element position in the result matrix are shown in Table 4.

TABLE 4

| For a Neuron Matrix Size of 3 × 3, Operation Sub-apparatuses Corresponding to Each Element Position in a Result Matrix with a Size of 3 × 3 | | |
|---|---|---|
| 0 | 2 | 3 |
| 3 | 0 | 1 |
| 1 | 0 | 2 |

For the winograd convolution forward transformation with the neuron matrix size of 3×3, according to the mapping relationship between the element positions in the result matrix and the operation sub-apparatuses in Table 4, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $d_{11} \rightarrow d_{01} \rightarrow d_{10} \rightarrow d_{00} \rightarrow d_{12} \rightarrow d_{02} \rightarrow d_{21} \rightarrow d_{31} \rightarrow d_{10}$.

In the winograd convolution transformation with the neuron matrix size of 3×3, compared with the winograd convolution transformation with the neuron matrix size of 4×4, the number of the operation sub-apparatuses is equal, but the number of the addition executions is significantly reduced. Therefore, it is not necessary to have all operation sub-apparatuses in the processing state within each clock to complete the addition calculations of each element in the result matrix within the 9 clocks. Hence, in the mapping relationship in Table 4, although the operation sub-apparatus numbered 0 corresponds to 3 element positions in the result matrix, and the operation sub-apparatuses numbered 1, 2 and 3 correspond to 2 element positions in the result matrix, it is also possible to achieve load balancing when the 4 operation sub-apparatuses perform the summation operation.

It may be understood that after the element values in the result matrix are obtained, the element values may be sequentially output to the other components, such as the master processing memory, so that the result matrix may be stored by the other components.

For the matrix d with a neuron matrix size of 4×1, the matrix multiplication between the neuron matrix and the winograd convolution forward transformation matrixes $B^T$ and B is expressed as shown in a formula (12):

$$S = Wino\{d\} = B_{4\times4}^T d_{4\times1} = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \begin{bmatrix} d_0 \\ d_1 \\ d_2 \\ d_3 \end{bmatrix}. \quad (12)$$

Transforming the plurality of sub-tensor to obtain the winograd transformation results of the plurality of sub-tensors may be expressed as shown in a formula (13):

$$d_0: d_0 * \begin{bmatrix} 1 \\ 0 \\ 0 \\ 0 \end{bmatrix}^T, d_1: d_1 * \begin{bmatrix} 0 \\ -1 \\ 1 \\ -1 \end{bmatrix}^T, d_2: d_2 * \begin{bmatrix} -1 \\ 1 \\ 1 \\ 0 \end{bmatrix}^T, d_3: d_3 * \begin{bmatrix} 0 \\ 0 \\ 0 \\ -1 \end{bmatrix}^T. \quad (13)$$

Due to the winograd convolution forward transformation of the neuron matrix, based on the size of the result matrix, the number of the clocks used to calculate the summation result is determined as 4×1=4. The number of the addition executions required to calculate the summation result is determined as $1*2+3*2-4*1=4$.

$1*2$ means that the number of the matrixes that are formed by the winograd transformation results of the sub-tensors with only 1 non-zero element is 2; $3*2$ indicates that the number of the matrixes that are formed by the winograd transformation results of the sub-tensors with 3 non-zero elements is 2; and $4*1$ is the size of the result matrix.

Based on the number of the clocks and the number of the addition executions required, the number of the operation sub-apparatuses is determined as 2. The 2 operation sub-apparatuses are numbered 0-1, and the operation sub-apparatuses corresponding to each element position in the result matrix are represented as shown in Table 5.

TABLE 5

For a Neuron Matrix Size of $4 \times 1$, Operation Sub-apparatuses Corresponding to Each Element Position in a Result Matrix with a Size of $4 \times 1$

| |
|---|
| 0 |
| 1 |
| 0 |
| 1 |

For the winograd convolution forward transformation with the neuron matrix size of 4×1, according to the mapping relationship between the element positions in the result matrix and the operation sub-apparatuses in Table 5, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $d_0 \rightarrow d_1 \rightarrow d_2 \rightarrow d_3$, so as to ensure that all operation sub-apparatuses are in the processing state within each clock and the summation operation at the same element position in the result matrix is performed by the same operation sub-apparatus.

Then during 4 clocks, within the first 2 consecutive clocks, 2 operation units input the one of additive numbers used to calculate each element position in the result matrix to the corresponding operation sub-apparatus to initially assign each element in the result matrix, where the operation sub-apparatuses are in the state of performing the initial assignment within the 2 consecutive clocks. Within the remaining 2 clocks, the remaining additive numbers used to calculate each element position in the result matrix are input to the corresponding operation sub-apparatuses for the addition calculations until each element value in the result matrix is obtained, where the operation sub-apparatuses are in the state of performing the summation operation within the 2 clocks.

For the matrix d with a neuron matrix size of 1×4, the winograd convolution transformation is similar to that of the matrix d with the neuron matrix size of 4×1, which will not be repeated here.

For the matrix d with a neuron matrix size of 3×1, the matrix multiplication between the neuron matrix and the matrixes $B^T$ and B of the winograd convolution forward transformation is expressed as shown in a formula (14):

$$S = Wino\{d\} = B_{3\times3}^T D_{3\times1} = \begin{bmatrix} 1 & -1 & 0 \\ 0 & 1 & 0 \\ 0 & -1 & 1 \end{bmatrix}\begin{bmatrix} d_0 \\ d_1 \\ d_2 \end{bmatrix}. \tag{14}$$

Transforming the plurality of sub-tensors to obtain the winograd transformation results of the plurality of sub-tensors may be expressed as shown in a formula (15):

$$d_{00}: d_{00} * \begin{bmatrix} 1 \\ 0 \\ 0 \end{bmatrix}^T, d_{01}: d_{01} * \begin{bmatrix} -1 \\ 1 \\ -1 \end{bmatrix}^T, d_{02}: d_{02} * \begin{bmatrix} 0 \\ 0 \\ 1 \end{bmatrix}^T. \tag{15}$$

Due to the winograd convolution forward transformation of the neuron matrix, based on the size of the result matrix, the number of the clocks used to calculate the summation result is determined as $3\times1=3$. The number of the addition executions required to calculate the summation result is determined as $1*2+3*3*1=2$.

$1*2$ means that the number of the matrixes that are formed by the winograd transformation results of the sub-tensors with only 1 non-zero element is 2; $3*1$ means that the number of the matrixes that are formed by the winograd transformation results of the sub-tensors with 3 non-zero elements is 1; and $3*1$ is the size of the result matrix.

Based on the number of the clocks and the number of the additions executions required, the number of the operation sub-apparatuses is determined as 3. The 3 operation sub-apparatuses are numbered 0-2, and the operation sub-apparatuses corresponding to each element position in the result matrix are shown in Table 6.

TABLE 6

For a Neuron Matrix Size of $3 \times 1$, Operation Sub-apparatuses Corresponding to Each Element Position in a Result Matrix with a Size of $3 \times 1$

| |
|---|
| 0 |
| 1 |
| 2 |

For the winograd convolution forward transformation with the neuron matrix size of 3×1, according to the mapping relationship between the element positions in the result matrix and the operation sub-apparatuses in Table 6, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $d_0 \rightarrow d_1 \rightarrow d_2$.

According to the winograd convolution operation method of the winograd convolution forward transformation with the neuron matrix size of 3×1, since the number of the operation sub-apparatuses is 3, and there are 3 clocks, and the number of the summation operations is 2, it is not necessary to have all operation sub-apparatuses in the processing state within each clock, and within the last clock, all 3 operation sub-apparatuses may be in an idle state.

For the matrix d with a neuron matrix size of 1×3, the winograd convolution transformation is similar to that of the matrix d with the neuron matrix size of 3×1, which will not be repeated here.

For the matrix with a weight matrix size of 3×3, the matrix multiplication between a weight matrix g and matrixes $G^T$ and G of the winograd convolution forward transformation is expressed as shown in a formula (16):

$$R = Wino\{g\} = G_{4\times3}^T g_{3\times3} G_{3\times4}^T = \tag{16}$$

$$\begin{bmatrix} 1 & 0 & 0 \\ 1 & 1 & 1 \\ 1 & -1 & 1 \\ 0 & 0 & 1 \end{bmatrix} \begin{bmatrix} g_{00} & g_{01} & g_{02} \\ g_{10} & g_{11} & g_{12} \\ g_{20} & g_{21} & g_{22} \end{bmatrix} \begin{bmatrix} 1 & 1 & 1 & 0 \\ 0 & 1 & -1 & 0 \\ 0 & 1 & 1 & 1 \end{bmatrix}.$$

Transforming the plurality of sub-tensors to obtain the winograd transformation results of the plurality of sub-tensors may be expressed as shown in a formula (17):

$$g_{00}: g_{00} * \begin{bmatrix} 1 & 1 & 1 & 0 \\ 1 & 1 & 1 & 0 \\ 1 & 1 & 1 & 0 \\ 0 & 0 & 0 & 0 \end{bmatrix}, \tag{17}$$

$$g_{01}: g_{01} * \begin{bmatrix} 0 & 1 & -1 & 0 \\ 0 & 1 & -1 & 0 \\ 0 & 1 & -1 & 0 \\ 0 & 0 & 0 & 0 \end{bmatrix}, g_{02}: g_{02} * \begin{bmatrix} 0 & 1 & 1 & 1 \\ 0 & 1 & 1 & 1 \\ 0 & 1 & 1 & 1 \\ 0 & 0 & 0 & 0 \end{bmatrix}$$

$$g_{10}: g_{10} * \begin{bmatrix} 0 & 0 & 0 & 0 \\ 1 & 1 & 1 & 0 \\ -1 & -1 & -1 & 0 \\ 0 & 0 & 0 & 0 \end{bmatrix},$$

$$g_{11}: g_{11} * \begin{bmatrix} 0 & 0 & 0 & 0 \\ 0 & 1 & -1 & 0 \\ 0 & -1 & 1 & 0 \\ 0 & 0 & 0 & 0 \end{bmatrix}, g_{12}: g_{12} * \begin{bmatrix} 0 & 0 & 0 & 0 \\ 0 & 1 & 1 & 1 \\ 0 & -1 & -1 & -1 \\ 0 & 0 & 0 & 0 \end{bmatrix}$$

$$g_{20}: g_{20} * \begin{bmatrix} 0 & 0 & 0 & 0 \\ 1 & 1 & 1 & 0 \\ 1 & 1 & 1 & 0 \\ 1 & 1 & 1 & 0 \end{bmatrix},$$

$$g_{21}: g_{21} * \begin{bmatrix} 0 & 0 & 0 & 0 \\ 0 & 1 & -1 & 0 \\ 0 & 1 & -1 & 0 \\ 0 & 1 & -1 & 0 \end{bmatrix}, g_{22}: g_{22} * \begin{bmatrix} 0 & 0 & 0 & 0 \\ 0 & 1 & 1 & 1 \\ 0 & 1 & 1 & 1 \\ 0 & 1 & 1 & 1 \end{bmatrix}.$$

Due to the winograd convolution forward transformation of the weight matrix, based on the size of the result matrix, the number of the clocks used to calculate the summation result is determined as 4×4=16. The number of the addition executions required to calculate the summation result is determined as 4*1+6*4+9*4−4*4=48.

4*1 means that the number of matrixes that are formed by the winograd transformation results of the sub-tensors with 4 non-zero elements is 1; 6*4 means that the number of matrixes that are formed by the winograd transformation results of the sub-tensors with 6 non-zero elements is 4; 9*4 means that the number of the matrixes that are formed by the winograd transformation results of the sub-tensors with 9 non-zero elements is 4; and 4*4 is the size of the result matrix.

According to the number of the clocks and the number of the addition executions required, the number of the operation sub-apparatuses is determined as 4, and the 4 operation sub-apparatuses are numbered 0-3. The operation sub-apparatuses corresponding to each element position in the result matrix are expressed as shown in Table 7.

TABLE 7

| For a Weight Matrix Size of 3 × 3, Operation Sub-apparatuses Corresponding to Each Element Position in a Result Matrix with a Size of 4 × 4 | | | |
|---|---|---|---|
| 0 | 0 | 1 | 1 |
| 2 | 0 | 1 | 3 |
| 3 | 3 | 2 | 2 |
| 3 | 1 | 0 | 2 |

For the winograd convolution forward transformation with the weight matrix size of 3×3, according to the mapping relationship between the element positions in the result matrix and the operation sub-apparatuses in Table 7, the summation operation at the same element positions in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_{11} \rightarrow g_{01} \rightarrow g_{10} \rightarrow g_{12} \rightarrow g_{21} \rightarrow g_{00} \rightarrow g_{02} \rightarrow g_{02} \rightarrow g_{20} \rightarrow g_{20} \rightarrow g_{22} \rightarrow g_{22}$.

It may be understood that after the element values in the result matrix are obtained, the element values may be sequentially output to the other components, such as the master processing memory, so that the result matrix may be stored by the other components.

For the matrix with a weight matrix size of 3×2, the matrix multiplication between the weight matrix g and the matrixes $G^T$ and G of the winograd convolution forward transformation is expressed as shown in a formula (18):

$$R = Wino\{g\} = G_{4\times3}^T g_{3\times2} G_{2\times3}^T = \begin{bmatrix} 1 & 0 & 0 \\ 1 & 1 & 1 \\ 1 & -1 & 1 \\ 0 & 0 & 1 \end{bmatrix} \begin{bmatrix} g_{00} & g_{01} \\ g_{10} & g_{11} \\ g_{20} & g_{21} \end{bmatrix} \begin{bmatrix} 1 & 1 & 0 \\ 0 & 1 & 1 \end{bmatrix}. \tag{18}$$

Transforming the plurality of sub-tensors to obtain the winograd transformation results of the plurality of sub-tensors may be expressed as shown in a formula (19):

$$g_{00}: g_{00} * \begin{bmatrix} 1 & 1 & 0 \\ 1 & 1 & 0 \\ 1 & 1 & 0 \\ 0 & 0 & 0 \end{bmatrix}, g_{01}: g_{01} * \begin{bmatrix} 0 & 1 & 1 \\ 0 & 1 & 1 \\ 0 & 1 & 1 \\ 0 & 0 & 0 \end{bmatrix} \tag{19}$$

$$g_{10}: g_{10} * \begin{bmatrix} 0 & 0 & 0 \\ 1 & 1 & 0 \\ -1 & -1 & 0 \\ 0 & 0 & 0 \end{bmatrix}, g_{11}: g_{11} * \begin{bmatrix} 0 & 0 & 0 \\ 0 & 1 & 1 \\ 0 & -1 & -1 \\ 0 & 0 & 0 \end{bmatrix}$$

$$g_{20}: g_{20} * \begin{bmatrix} 0 & 0 & 0 \\ 1 & 1 & 0 \\ 1 & 1 & 0 \\ 1 & 1 & 0 \end{bmatrix}, g_{21}: g_{21} * \begin{bmatrix} 0 & 0 & 0 \\ 0 & 1 & 1 \\ 0 & 1 & 1 \\ 0 & 1 & 1 \end{bmatrix}.$$

Due to the winograd convolution forward transformation of the weight matrix, based on the size of the result matrix, the number of the clocks used to calculate the summation result is determined as 4×3=12. The number of the addition executions required to calculate the summation result is determined as 4*1+6*4−4*3=20.

4*1 means that the number of the matrixes that are formed by the winograd transformation results of the sub-tensors with 4 non-zero elements is 1; 6*4 means that the number of the matrixes that are formed by the winograd transformation results of the sub-tensors with 6 non-zero elements is 4; and 4*3 is the size of the result matrix.

According to the number of the clocks and the number of the addition executions required, the number of the operation sub-apparatuses is determined as 4. The 4 operation sub-apparatuses are numbered 0-3, and the operation sub-apparatuses corresponding to each element position in the result matrix are shown in Table 8.

TABLE 8

For a Weight Matrix Size of 3 × 2, Operation Sub-apparatuses
Corresponding to Each Element Position in a Result Matrix
with a Size of 4 × 3

| 0 | 2 | 1 |
|---|---|---|
| 1 | 0 | 1 |
| 2 | 3 | 2 |
| 3 | 1 | 2 |

For the winograd convolution forward transformation with the weight matrix size of 3×2, according to the mapping relationship between the element positions in the result matrix and the operation sub-apparatuses in Table 8, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_{00} \rightarrow g_{01} \rightarrow g_{20} \rightarrow g_{21} \rightarrow g_{10} \rightarrow g_{01}$.

For the winograd convolution forward transformation with the weight matrix size of 3×2, it is not necessary to have all the operation sub-apparatuses in the processing state within each clock, and therefore, in the mapping relationship in Table 8, the operation sub-apparatuses numbered 0 and 3 correspond to 2 element positions in the result matrix, while the operation sub-apparatuses numbered 1 and 2 correspond to 4 element positions in the result matrix.

It may be understood that after the element values in the result matrix are obtained, the element values may be sequentially output to the other components, such as the master processing memory, so that the result matrix may be stored by the other components.

For the matrix with a weight matrix size of 2×3, the matrix multiplication between the weight matrix g and the matrixes $G^T$ and, of the winograd convolution forward transformation is expressed as shown in a formula (20):

$$R = Wino\{g\} = G_{3\times2}^T g_{2\times3} G_{3\times4}^T = \begin{bmatrix} 1 & 0 \\ 1 & 1 \\ 0 & 1 \end{bmatrix} \begin{bmatrix} g_{00} & g_{01} & g_{02} \\ g_{10} & g_{11} & g_{12} \end{bmatrix} \begin{bmatrix} 1 & 1 & 1 & 0 \\ 0 & 1 & -1 & 0 \\ 0 & 1 & 1 & 1 \end{bmatrix}. \quad (20)$$

Transforming the plurality of sub-tensors to obtain winograd transformation results of the plurality of sub-tensors may be expressed as shown in a formula (21):

$$g_{00}: g_{00} * \begin{bmatrix} 1 & 1 & 1 & 0 \\ 1 & 1 & 1 & 0 \\ 0 & 0 & 0 & 0 \end{bmatrix}, \quad (21)$$

$$g_{01}: g_{01} * \begin{bmatrix} 0 & 1 & -1 & 0 \\ 0 & 1 & -1 & 0 \\ 0 & 0 & 0 & 0 \end{bmatrix}, g_{02}: g_{02} * \begin{bmatrix} 0 & 1 & 1 & 1 \\ 0 & 1 & 1 & 1 \\ 0 & 0 & 0 & 0 \end{bmatrix}$$

-continued $$g_{10}: g_{10} * \begin{bmatrix} 0 & 0 & 0 & 0 \\ 1 & 1 & 1 & 0 \\ 1 & 1 & 1 & 0 \end{bmatrix},$$

$$g_{11}: g_{11} * \begin{bmatrix} 0 & 0 & 0 & 0 \\ 0 & 1 & -1 & 0 \\ 0 & 1 & -1 & 0 \end{bmatrix}, g_{12}: g_{12} * \begin{bmatrix} 0 & 0 & 0 & 0 \\ 0 & 1 & 1 & 1 \\ 0 & 1 & 1 & 1 \end{bmatrix}.$$

Due to the winograd convolution forward transformation of the weight matrix, based on the size of the result matrix, the number of the clocks used to calculate the summation result is determined as 3×4=12. The number of the addition executions required to calculate the summation result is determined as 4*1+6*4−3*4=20.

4*1 means that the number of the matrixes that are formed by the winograd transformation results of the sub-tensors with 4 non-zero elements is 1; 6*4 means that the number of the matrixes that are formed by the winograd transformation results of the sub-tensors with 6 non-zero elements is 4; and 3*4 is the size of the result matrix.

According to the number of the clocks and the number of the addition executions required, the number of the operation sub-apparatuses is determined as 4. The 4 operation sub-apparatuses are numbered 0-3, and the operation sub-apparatuses corresponding to each element position in the result matrix are shown in Table 9.

TABLE 9

For a Weight Matrix Size of 2 × 3, Operation Sub-apparatuses
Corresponding to Each Element Position in a Result Matrix
with a Size of 3 × 4

| 1 | 1 | 2 | 2 |
|---|---|---|---|
| 2 | 0 | 3 | 1 |
| 0 | 1 | 2 | 3 |

For the winograd convolution forward transformation with the weight matrix size of 2×3, according to the mapping relationship between the element positions in the result matrix and the operation sub-apparatuses in Table 9, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_{00} \rightarrow g_{02} \rightarrow g_{10} \rightarrow g_{12} \rightarrow g_{01} \rightarrow g_{11}$.

According to the winograd convolution operation method of the winograd convolution forward transformation with the weight matrix size of 3×2, it is not necessary to have all the operation sub-apparatuses in the processing state within each clock. Therefore, in the mapping relationship of Table 9, the operation sub-apparatuses numbered 0 and 3 correspond to 2 element positions in the result matrix, while the operation sub-apparatuses numbered 1 and 2 correspond to 4 element positions in the result matrix.

It may be understood that after the element values in the result matrix are obtained, the element values may be sequentially output to the other components, such as the master processing memory, so that the result matrix may be stored by the other components.

For the matrix with a weight matrix size of 2×2, the matrix multiplication between the weight matrix g and the matrixes $G^T$ and G of the winograd convolution forward transformation is expressed as shown in a formula (22):

$$R = Wino\{g\} = G^T_{3\times2}g_{2\times2}G^T_{2\times3} = \begin{bmatrix} 1 & 0 \\ 1 & 1 \\ 0 & 1 \end{bmatrix}\begin{bmatrix} g_{00} & g_{01} \\ g_{10} & g_{11} \end{bmatrix}\begin{bmatrix} 1 & 1 & 1 \\ 0 & 1 & 1 \end{bmatrix}. \quad (22)$$

Transforming the plurality of sub-tensors to obtain the winograd transformation results of the plurality of sub-tensors may be expressed as shown in a formula (23):

$$g_{00}: g_{00} * \begin{bmatrix} 1 & 1 & 0 \\ 1 & 1 & 0 \\ 0 & 0 & 0 \end{bmatrix}, g_{02}: g_{02} * \begin{bmatrix} 0 & 1 & 1 \\ 0 & 1 & 1 \\ 0 & 0 & 0 \end{bmatrix} \quad (23)$$

$$g_{10}: g_{10} * \begin{bmatrix} 0 & 0 & 0 \\ 1 & 1 & 0 \\ 1 & 1 & 0 \end{bmatrix}, g_{12}: g_{12} * \begin{bmatrix} 0 & 0 & 0 \\ 0 & 1 & 1 \\ 0 & 1 & 1 \end{bmatrix}.$$

Due to the winograd convolution forward transformation of the weight matrix, based on the size of the result matrix, the number of the clocks used to calculate the summation result is determined as $3\times3=9$. The number of the addition executions required to calculate the summation result is determined as $4*4-3*3=7$.

$4*4$ means that the number of the matrixes that are formed by the winograd transformation results of the sub-tensors with 4 non-zero elements is 4; and $3*3$ is the size of the result matrix.

According to the number of the clocks and the number of the addition executions required, the number of the operation sub-apparatuses is determined as 4, and the 4 operation sub-apparatuses are numbered 0-3, and the operation sub-apparatuses corresponding to each element position in the result matrix are shown in Table 10.

TABLE 10

For a Weight Matrix Size of $2 \times 2$, Operation Sub-apparatuses Corresponding to Each Element Position in a Result Matrix with a Size of $3 \times 3$

| | | |
|---|---|---|
| 3 | 1 | 3 |
| 2 | 0 | 2 |
| 3 | 1 | 3 |

For the winograd convolution forward transformation with the weight matrix size of $2\times2$, according to the mapping relationship between the element positions in the result matrix and the operation sub-apparatuses in Table 10, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_{00} \to g_{01} \to g_{10} \to g_{11}$.

According to the winograd convolution operation method of the winograd convolution forward transformation with the weight matrix size of $2\times2$, it is not necessary to have all the operation sub-apparatuses in the processing state within each clock, and therefore, in the mapping relationship in Table 10, the operation sub-apparatus numbered 0 corresponds to 1 element position in the result matrix, and the operation sub-apparatuses numbered 1 and 2 correspond to 2 element positions in the result matrix, and the operation sub-apparatus numbered 3 corresponds to 4 element positions in the result matrix.

It may be understood that after the element values in the result matrix are obtained, the element values may be sequentially output to the other components, such as the master processing memory, so that the result matrix may be stored by the other components.

For the matrix with a weight matrix size of $3\times1$, the matrix multiplication between the weight matrix g and the matrixes $G^T$ and G of the winograd convolution forward transformation is expressed as shown in a formula (24):

$$R = Wino\{g\} = G_{4\times3}g_{3\times1} = \begin{bmatrix} 1 & 0 & 0 \\ 1 & 1 & 1 \\ 1 & -1 & 1 \\ 0 & 0 & 1 \end{bmatrix}\begin{bmatrix} g_0 \\ g_1 \\ g_2 \end{bmatrix}. \quad (24)$$

Transforming the plurality of sub-tensors to obtain the winograd transformation results of the plurality of sub-tensors may be expressed as shown in a formula (25):

$$g_0:g_0 * \begin{bmatrix} 1 \\ 1 \\ 1 \\ 0 \end{bmatrix}, g_1:g_1 * \begin{bmatrix} 0 \\ 1 \\ -1 \\ 0 \end{bmatrix}, g_2:g_2 * \begin{bmatrix} 0 \\ 1 \\ 1 \\ 1 \end{bmatrix}. \quad (25)$$

Due to the winograd convolution forward transformation of the weight matrix, based on the size of the result matrix, the number of the clocks used to calculate the summation result is determined as $4\times1=4$. The number of the addition executions required to calculate the summation result is determined as $2*1+3*2-4*1=4$.

$2*1$ means that the number of matrixes that are formed by the winograd transformation results of the sub-tensors with 2 non-zero elements is 1; $3*2$ means that the number of the matrixes that are formed by the winograd transformation results of the sub-tensors with 3 non-zero elements is 2; and $4*1$ is the size of the result matrix.

Based on the number of the clocks and the number of the addition executions required, the number of the operation sub-apparatuses is determined as 2, and the 2 operation sub-apparatuses are numbered 0-1, and the operation sub-apparatuses corresponding to each element position in the result matrix are shown in Table 11.

For the winograd convolution forward transformation with the weight matrix size of $3\times1$, according to the mapping relationship between the element positions in the result matrix and the operation sub-apparatuses in Table 11, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_0 \to g_1 \to g_2$, so as to ensure that all the operation sub-apparatuses are in the processing state within each clock.

TABLE 11

For a Weight Matrix Size of $3 \times 1$, Operation Sub-apparatuses Corresponding to Each Element Position in a Result Matrix with a Size of $4 \times 1$

| |
|---|
| 0 |
| 0 |

TABLE 11-continued

For a Weight Matrix Size of 3 × 1, Operation Sub-apparatuses
Corresponding to Each Element Position in a Result Matrix
with a Size of 4 × 1

1
1

It may be understood that after the element values in the result matrix are obtained, the element values may be sequentially output to the other components, such as the master processing memory, so that the result matrix may be stored by the other components.

For the matrix g with a weight matrix size of 1×3, the winograd convolution transformation is similar to that of the matrix g with the weight matrix size of 3×1, which will not be repeated here.

For the matrix with a weight matrix size of 2×1, the matrix multiplication between the weight matrix g and the matrixes $G^T$ and G of the winograd convolution forward transformation is expressed as shown in a formula (26):

$$R = Wino\{g\} = G_{3\times2}g_{2\times1} = \begin{bmatrix} 1 & 0 \\ 1 & 1 \\ 0 & 1 \end{bmatrix}\begin{bmatrix} g_0 \\ g_1 \end{bmatrix}. \quad (26)$$

Transforming the plurality of sub-tensors to obtain the winograd transformation results of the plurality of sub-tensors may be expressed as shown in a formula (27):

$$g_0{:}g_0 * \begin{bmatrix} 1 \\ 1 \\ 0 \end{bmatrix}, g_1{:}g_1 * \begin{bmatrix} 0 \\ 1 \\ 1 \end{bmatrix}. \quad (27)$$

Due to the winograd convolution forward transformation of the weight matrix, based on the size of the result matrix, the number of the clocks used to calculate the summation result is determined as 3×1=3. The number of the addition executions required to calculate the summation result is determined as 2*2−3*1=1.

2*2 indicates that the number of the matrixes that are formed by the winograd transformation results of the sub-tensors with 2 non-zero elements; and 3*1 is the size of the result matrix.

Based on the number of the clocks and the number of the addition executions required, the number of the operation sub-apparatuses is determined as 2, and the 2 operation sub-apparatuses are numbered 0-1 and the operation sub-apparatuses corresponding to each element position in the result matrix are shown in Table 12.

For the winograd convolution forward transformation with the weight matrix size of 2×1, according to the mapping relationship between the element positions in the result matrix and the operation sub-apparatuses in Table 12, the summation operation at the same element position in the result matrix may be performed by the same operation sub-apparatus. When the addition execution tasks used to calculate each element in the result matrix are distributed to the operation sub-apparatuses correspondingly, the matrixes that are formed by the winograd transformation results of the sub-tensors are read in an order of $g_0 \rightarrow g_1$.

TABLE 12

For a Weight Matrix Size of 2 × 1, Operation Sub-apparatuses
Corresponding to Each Element Position in a Result Matrix
with a Size of 3 × 1

1
0
1

For the winograd convolution forward transformation with the weight matrix size of 2×1, it is not necessary to have all the operation sub-apparatuses in the processing state within each clock, and therefore, in the mapping relationship in Table 12, the operation sub-apparatus numbered 0 corresponds to 1 element position in the result matrix, and the operation sub-apparatus numbered 1 corresponds to 2 element positions in the result matrix.

It may be understood that after the element values in the result matrix are obtained, the element values may be sequentially output to the other components, such as the master processing memory, so that the result matrix may be stored by the other components.

For the matrix g with a weight matrix size of 1×2, the winograd convolution transformation is similar to that of the matrix g with the weight matrix size of 2×1, which will not be repeated here.

For a matrix f with a transformed element-wise multiplication matrix size of 4×4, the matrix multiplication between a transformed element-wise multiplication matrix and matrixes $A^T$ and A of a winograd convolution inverse transformation is shown in a formula (28):

$$L_{2\times2} = \quad (28)$$

$$A^T_{2\times4}f_{4\times4}A_{4\times2} = \begin{bmatrix} 1 & \frac{1}{2} & \frac{1}{2} & 0 \\ 0 & \frac{1}{2} & -\frac{1}{2} & -1 \end{bmatrix}\begin{bmatrix} f_{00} & f_{01} & f_{02} & f_{03} \\ f_{10} & f_{11} & f_{12} & f_{13} \\ f_{20} & f_{21} & f_{22} & f_{23} \\ f_{30} & f_{31} & f_{32} & f_{33} \end{bmatrix}\begin{bmatrix} 1 & 0 \\ \frac{1}{2} & \frac{1}{2} \\ \frac{1}{2} & -\frac{1}{2} \\ 0 & -1 \end{bmatrix}.$$

Transforming the plurality of sub-tensors to obtain the winograd transformation results of the plurality of sub-tensors may be expressed as shown in a formula (29):

$$f_{00}{:}f_{00} * \begin{bmatrix} 1 & 0 \\ 0 & 0 \end{bmatrix}, f_{01}{:}f_{01} * \begin{bmatrix} \frac{1}{2} & \frac{1}{2} \\ 0 & 0 \end{bmatrix}, \quad (29)$$

$$f_{02}{:}f_{02} * \begin{bmatrix} \frac{1}{2} & -\frac{1}{2} \\ 0 & 0 \end{bmatrix}, f_{03}{:}f_{03} * \begin{bmatrix} 0 & -1 \\ 0 & 0 \end{bmatrix}$$

$$f_{10}{:}f_{10} * \begin{bmatrix} \frac{1}{2} & 0 \\ \frac{1}{2} & 0 \end{bmatrix}, f_{11}{:}f_{11} * \begin{bmatrix} \frac{1}{4} & \frac{1}{4} \\ \frac{1}{4} & \frac{1}{4} \end{bmatrix},$$

$$f_{12}{:}f_{12} * \begin{bmatrix} \frac{1}{4} & -\frac{1}{4} \\ \frac{1}{4} & -\frac{1}{4} \end{bmatrix}, f_{13}{:}f_{13} * \begin{bmatrix} 0 & -\frac{1}{2} \\ 0 & -\frac{1}{2} \end{bmatrix}$$

39
-continued $$f_{20}:f_{20} * \begin{bmatrix} \frac{1}{2} & 0 \\ -\frac{1}{2} & 0 \end{bmatrix}, \; f_{21}:f_{21} * \begin{bmatrix} \frac{1}{4} & \frac{1}{4} \\ -\frac{1}{4} & -\frac{1}{4} \end{bmatrix},$$

$$f_{22}:f_{22} * \begin{bmatrix} \frac{1}{4} & -\frac{1}{4} \\ -\frac{1}{4} & \frac{1}{4} \end{bmatrix}, \; f_{23}:f_{23} * \begin{bmatrix} 0 & -\frac{1}{2} \\ 0 & \frac{1}{2} \end{bmatrix}$$

$$f_{30}:f_{30} * \begin{bmatrix} 0 & 0 \\ -1 & 0 \end{bmatrix}, \; f_{31}:f_{31} * \begin{bmatrix} 0 & 0 \\ -\frac{1}{2} & -\frac{1}{2} \end{bmatrix},$$

$$f_{32}:f_{32} * \begin{bmatrix} 0 & 0 \\ -\frac{1}{2} & \frac{1}{2} \end{bmatrix}, \; f_{33}:f_{33} * \begin{bmatrix} 0 & 0 \\ 0 & 1 \end{bmatrix}.$$

Due to the winograd convolution inverse transformation of the transformed element-wise multiplication matrix, based on the size of the sub-tensors, the number of the clocks used to calculate the summation result is determined as 4×4=16. The number of the addition executions required is: 1*4+2*8+4*4−2*2=32.

1*4 means that the number of the matrixes that are formed by the winograd transformation results of the sub-tensors with only 1 non-zero element is 4; 2*8 means that the number of the matrixes that are formed by the winograd transformation results of the sub-tensors with 2 non-zero elements is 8; 4*4 means that the number of the matrixes that are formed by the winograd transformation results of the sub-tensors with 4 non-zero elements is 4; and 2*2 is the size of the result matrix.

Based on the number of the clocks and the number of the addition executions required, the number of the operation sub-apparatuses is determined as 4. The 4 operation sub-apparatuses are numbered 0-3.

Since there are 4 element positions in the result matrix that may be mapped one-to-one with the 4 operation sub-apparatuses, according to the mapping relationship, the addition execution tasks used to calculate each element in the result matrix may be distributed to the 4 operation sub-apparatuses correspondingly, and the 4 operation sub-apparatuses may complete the addition calculations of the elements in the result matrix within the 16 clocks. It is not necessary to plan an input order of the matrixes that are formed by the winograd transformation results of the sub-tensors, and the matrixes that are formed by the winograd transformation results of the sub-tensors are sequentially input: $f_{00} \to f_{01} \to f_{02} \to f_{03} \to f_{10} \to f_{11} \to f_{12} \to f_{13} \to f_{20} \to f_{21} \to f_{22} \to f_{23} \to f_{30} \to f_{31} \to f_{32} \to f_{33}$ For the matrix f with a transformed element-wise multiplication matrix size of 4×3, the matrix multiplication between the transformed element-wise multiplication matrix and the matrixes $A^T$ and A of the winograd convolution inverse transformation is expressed as shown in a formula (30):

$$L_{2\times2} = A_{2\times4}^T f_{4\times3} A_{3\times2} = \begin{bmatrix} 1 & \frac{1}{2} & \frac{1}{2} & 0 \\ 0 & \frac{1}{2} & -\frac{1}{2} & -1 \end{bmatrix} \begin{bmatrix} f_{00} & f_{01} & f_{02} \\ f_{10} & f_{11} & f_{12} \\ f_{20} & f_{21} & f_{22} \\ f_{30} & f_{31} & f_{32} \end{bmatrix} \begin{bmatrix} 1 & 0 \\ 1 & 1 \\ 0 & 1 \end{bmatrix}. \tag{30}$$

Transforming the plurality of sub-tensors to obtain the winograd transformation results of the plurality of sub-tensors may be expressed as shown in a formula (31):

$$f_{00}:f_{00} * \begin{bmatrix} 1 & 0 \\ 0 & 0 \end{bmatrix}, \; f_{01}:f_{01} * \begin{bmatrix} 1 & 1 \\ 0 & 0 \end{bmatrix}, \; f_{02}:f_{02} * \begin{bmatrix} 0 & 1 \\ 0 & 0 \end{bmatrix} \tag{31}$$

$$f_{10}:f_{10} * \begin{bmatrix} \frac{1}{2} & 0 \\ \frac{1}{2} & 0 \end{bmatrix}, \; f_{11}:f_{11} * \begin{bmatrix} \frac{1}{2} & \frac{1}{2} \\ \frac{1}{2} & \frac{1}{2} \end{bmatrix}, \; f_{12}:f_{12} * \begin{bmatrix} 0 & \frac{1}{2} \\ 0 & \frac{1}{2} \end{bmatrix}$$

$$f_{20}:f_{20} * \begin{bmatrix} \frac{1}{2} & 0 \\ -\frac{1}{2} & 0 \end{bmatrix}, \; f_{21}:f_{21} * \begin{bmatrix} \frac{1}{2} & \frac{1}{2} \\ -\frac{1}{2} & -\frac{1}{2} \end{bmatrix}, \; f_{22}:f_{22} * \begin{bmatrix} 0 & \frac{1}{2} \\ 0 & -\frac{1}{2} \end{bmatrix}$$

$$f_{30}:f_{30} * \begin{bmatrix} 0 & 0 \\ -1 & 0 \end{bmatrix}, \; f_{31}:f_{31} * \begin{bmatrix} 0 & 0 \\ -1 & -1 \end{bmatrix}, \; f_{32}:f_{32} * \begin{bmatrix} 0 & 0 \\ 0 & -1 \end{bmatrix}.$$

Due to the winograd convolution inverse transformation of the transformed element-wise multiplication matrix, based on the size of the sub-tensors, the number of the clocks used to calculate the summation result is determined as 4×3=12, and the number of the addition executions required is: 1*4+2*6+4*2−2*2=20.

1*4 means that the number of the matrixes that are formed by the winograd transformation results of the sub-tensors with only 1 non-zero element is 4; 2*6 means that the number of the matrixes that are formed by the winograd transformation results of the sub-tensors with 2 non-zero elements is 6; 4*2 means that the number of the matrixes that are formed by the winograd transformation results of the sub-tensors with 4 non-zero elements is 2; and 2*2 is the size of the result matrix.

According to the number of the clocks and the number of the addition executions required, the number of the computation sub-apparatuses is determined as 4, and the 4 operation sub-apparatuses are numbered 0-3.

Similarly, since there are 4 element positions in the result matrix that may be mapped one-to-one with the 4 operation sub-apparatuses, according to this mapping relationship, the addition execution tasks used to calculate each element in the result matrix are distributed to the 4 operation sub-apparatuses correspondingly, and the 4 operation sub-apparatuses may complete the addition calculations of each element in the result matrix within the 16 clocks. It is not necessary to plan the input order of the matrixes that are formed by the winograd transformation results of the sub-tensors, and the matrixes that are formed by the winograd transformation results of the sub-tensors are sequentially input: $f_{00} \to f_{01} \to f_{02} \to f_{10} \to f_{11} \to f_{12} \to f_{20} \to f_{21} \to f_{22} \to f_{30} \to f_{31} \to f_{32}$.

For the matrix f with a transformed element-wise multiplication matrix size of 3×4, the matrix multiplication between the transformed element-wise multiplication matrix and the matrixes $A^T$ and A of the winograd convolution inverse transformation is expressed as shown in a formula (32):

$$L_{2\times2} =$$

$$A_{2\times3}^T f_{3\times4} A_{4\times2} = \begin{bmatrix} 1 & 1 & 0 \\ 0 & 1 & 1 \end{bmatrix} \begin{bmatrix} f_{00} & f_{01} & f_{02} & f_{03} \\ f_{10} & f_{11} & f_{12} & f_{13} \\ f_{20} & f_{21} & f_{22} & f_{23} \end{bmatrix} \begin{bmatrix} 1 & 0 \\ \frac{1}{2} & \frac{1}{2} \\ \frac{1}{2} & -\frac{1}{2} \\ 0 & -1 \end{bmatrix}. \tag{32}$$

41 · 42

Transforming the plurality of sub-tensors to obtain the winograd transformation results of the plurality of sub-tensors may be expressed as shown in a formula (33):

$$f_{00}{:}f_{00} * \begin{bmatrix} 1 & 0 \\ 0 & 0 \end{bmatrix}, f_{01}{:}f_{01} * \begin{bmatrix} \frac{1}{2} & \frac{1}{2} \\ 0 & 0 \end{bmatrix},$$ (33)

$$f_{02}{:}f_{02} * \begin{bmatrix} \frac{1}{2} & -\frac{1}{2} \\ 0 & 0 \end{bmatrix}, f_{03}{:}f_{03} * \begin{bmatrix} 0 & -1 \\ 0 & 0 \end{bmatrix}$$

$$f_{10}{:}f_{10} * \begin{bmatrix} 1 & 0 \\ 1 & 0 \end{bmatrix}, f_{11}{:}f_{11} * \begin{bmatrix} \frac{1}{2} & \frac{1}{2} \\ \frac{1}{2} & \frac{1}{2} \end{bmatrix},$$

$$f_{12}{:}f_{12} * \begin{bmatrix} \frac{1}{2} & -\frac{1}{2} \\ \frac{1}{2} & -\frac{1}{2} \end{bmatrix}, f_{13}{:}f_{13} * \begin{bmatrix} 0 & -1 \\ 0 & -1 \end{bmatrix}$$

$$f_{20}{:}f_{20} * \begin{bmatrix} 0 & 0 \\ 1 & 0 \end{bmatrix}, f_{21}{:}f_{21} * \begin{bmatrix} 0 & 0 \\ 1 & 1 \\ \frac{1}{2} & \frac{1}{2} \end{bmatrix},$$

$$f_{22}{:}f_{22} * \begin{bmatrix} 0 & 0 \\ 1 & -\frac{1}{2} \\ \frac{1}{2} & \end{bmatrix}, f_{23}{:}f_{23} * \begin{bmatrix} 0 & 0 \\ 0 & -1 \end{bmatrix}.$$

Due to the winograd convolution inverse transformation of the transformed element-wise multiplication matrix, based on the size of the sub-tensors, the number of the clocks used to calculate the summation result is determined as 3×4=12. The number of the addition executions required is: 1*4+2*6+4*2−2*2=20.

1*4 means that the number of the matrixes that are formed by the winograd transformation results of the sub-tensors with only 1 non-zero element is 4; 2*6 means that the number of the matrixes that are formed by the winograd transformation results of the sub-tensors with 2 non-zero elements is 6; 4*2 means that the number of the matrixes that are formed by the winograd transformation results of the sub-tensors with 4 non-zero elements is 2; and 2*2 is the size of the result matrix.

The number of the operation sub-apparatuses is determined as 4 according to the number of the clocks and the number of the addition executions required. The 4 operation sub-apparatuses are numbered 0-3.

Since there are 4 element positions in the result matrix that may be mapped one-to-one with the 4 operation sub-apparatuses, according to this mapping relationship, the addition execution tasks used to calculate each element in the result matrix may be distributed to the 4 operation sub-apparatuses correspondingly, and the 4 operation sub-apparatuses may complete the addition calculations of each element in the result matrix within the 12 clocks. It is not necessary to plan the input order of the matrixes that are formed by the winograd transformation results of the sub-tensors, the matrixes that are formed by the winograd transformation results of the sub-tensors are sequentially input:
$f_{00}{\to}f_{01}{\to}f_{02}{\to}f_{03}{\to}f_{10}{\to}f_{11}{\to}f_{12}{\to}f_{13}{\to}f_{20}{\to}f_{21}{\to}f_{22}{\to}f_{23}$.

For the matrix f with a transformed element-wise multiplication matrix size of 3×3, the matrix multiplication between the transformed element-wise multiplication matrix and the matrixes $A^T$ and A of the winograd convolution inverse transformation is expressed as shown in a formula (34):

$$L_{2\times2} = A_{2\times3}^T f_{3\times3} A_{3\times2} = \begin{bmatrix} 1 & 1 & 0 \\ 0 & 1 & 1 \end{bmatrix} \begin{bmatrix} f_{00} & f_{01} & f_{02} \\ f_{10} & f_{11} & f_{12} \\ f_{20} & f_{21} & f_{22} \end{bmatrix} \begin{bmatrix} 1 & 0 \\ 1 & 1 \\ 0 & 1 \end{bmatrix}.$$ (34)

Transforming the plurality of sub-tensors to obtain the winograd transformation results of the plurality of sub-tensors may be expressed as shown in a formula (35):

$$f_{00}{:}f_{00} * \begin{bmatrix} 1 & 0 \\ 0 & 0 \end{bmatrix}, f_{01}{:}f_{01} * \begin{bmatrix} 1 & 1 \\ 0 & 0 \end{bmatrix}, f_{02}{:}f_{02} * \begin{bmatrix} 0 & 1 \\ 0 & 0 \end{bmatrix}$$ (35)

$$f_{10}{:}f_{10} * \begin{bmatrix} 1 & 0 \\ 1 & 0 \end{bmatrix}, f_{11}{:}f_{11} * \begin{bmatrix} 1 & 1 \\ 1 & 1 \end{bmatrix}, f_{12}{:}f_{12} * \begin{bmatrix} 0 & 1 \\ 0 & 1 \end{bmatrix}$$

$$f_{20}{:}f_{20} * \begin{bmatrix} 0 & 0 \\ 1 & 0 \end{bmatrix}, f_{21}{:}f_{21} * \begin{bmatrix} 0 & 0 \\ 1 & 1 \end{bmatrix}, f_{22}{:}f_{22} * \begin{bmatrix} 0 & 0 \\ 0 & 1 \end{bmatrix}.$$

Due to the winograd convolution inverse transformation of the transformed element-wise multiplication matrix, based on the size of the sub-tensors, the number of the clocks used to calculate the summation result is determined as 3×3=9. The number of the addition executions required is: 1*4+2*4+4*2*2=12.

1*4 means that the number of the matrixes that are formed by the winograd transformation results of the sub-tensors with only 1 non-zero element is 4; 2*4 means that the number of the matrixes that are formed by the winograd transformation results of the sub-tensors with 2 non-zero elements is 4; 4*1 means that the number of the matrixes that are formed by the winograd transformation results with the sub-tensors with 4 non-zero elements is 1; and 2*2 is the size of the result matrix.

The number of the operation sub-apparatuses is determined as 4 according to the number of the clocks and the number of the addition executions required. The 4 operation sub-apparatuses are numbered 0-3.

Since there are 4 element positions in the result matrix that may be mapped one-to-one with the 4 operation sub-apparatuses, according to this mapping relationship, the addition execution tasks used to calculate each element in the result matrix may be distributed to the 4 operation sub-apparatuses correspondingly, and the 4 operation sub-apparatuses may complete the addition calculations of each element in the result matrix within the 9 clocks. It is not necessary to plan the input order of the matrixes that are formed by the winograd transformation results of the sub-tensors, and the matrixes that are formed by the winograd transformation results of the sub-tensors are sequentially input: $f_{00}{\to}f_{01}{\to}f_{02}{\to}f_{10}{\to}f_{11}{\to}f_{12}{\to}f_{20}{\to}f_{21}{\to}f_{22}$.

For the matrix f with a transformed element-wise multiplication matrix size of 4×1, the matrix multiplication between the transformed element-wise multiplication matrix and the matrixes $A^T$ and A of the winograd convolution inverse transformation is expressed as shown in a formula (36):

$$L_{2\times1} = A_{2\times4}^T f_{4\times1} = \begin{bmatrix} 1 & \frac{1}{2} & \frac{1}{2} & 0 \\ 0 & \frac{1}{2} & -\frac{1}{2} & -1 \end{bmatrix} \begin{bmatrix} f_0 \\ f_1 \\ f_2 \\ f_3 \end{bmatrix}.$$ (36)

Transforming the plurality of sub-tensors to obtain the winograd transformation results of the plurality of sub-tensors may be expressed as shown in a formula (37):

$$f_0 : f_0 * \begin{bmatrix} 1 \\ 0 \end{bmatrix}, \ f_1 : f_1 * \begin{bmatrix} \frac{1}{2} \\ \frac{1}{2} \\ \frac{1}{2} \end{bmatrix}, \ f_2 : f_2 * \begin{bmatrix} \frac{1}{2} \\ -\frac{1}{2} \end{bmatrix}, \ f_3 : f_3 * \begin{bmatrix} 0 \\ -1 \end{bmatrix}. \quad (37)$$

Due to the winograd convolution inverse transformation of the transformed element-wise multiplication matrix, based on the size of the sub-tensors, the number of the clocks used to calculate the summation result is determined as $4 \times 1 = 4$. The number of the addition executions required is: $1*2 + 2*2 - 2*2 = 4$.

$1*2$ means that the number of the matrixes that are formed by the winograd transformation results of the sub-tensors with only 1 non-zero element is 2; $2*2$ means that the number of the matrixes that are formed by the winograd transformation results of the sub-tensors with 2 non-zero elements is 2; and $2*2$ is the size of the result matrix.

The number of the operation sub-apparatuses is determined as 4 according to the number of the clocks and the number of the addition executions required. The 4 operation sub-apparatuses are numbered 0-3.

Since there are 4 element positions in the result matrix that may be mapped one-to-one with the 4 operation sub-apparatuses, according to this mapping relationship, the addition execution tasks used to calculate each element in the result matrix may be distributed to the 4 operation sub-apparatuses correspondingly, and the 4 operation sub-apparatuses may complete the addition calculations of each element in the result matrix within the 4 clocks. It is not necessary to plan the input order of the matrixes that are formed by the winograd transformation results of the sub-tensors, and the matrixes that are formed by the winograd transformation results of the sub-tensors are sequentially input: $f_{00} \rightarrow f_{01} \rightarrow f_{02} \rightarrow f_{03}$.

For the matrix f with a transformed element-wise multiplication matrix size of $3 \times 1$, the matrix multiplication between the transformed element-wise multiplication matrix and the matrixes $A^T$ and A of the winograd convolution inverse transformation is expressed as shown in a formula (38):

$$L_{2 \times 1} = A_{2 \times 3}^T f_{3 \times 1} = \begin{bmatrix} 1 & 1 & 0 \\ 0 & 1 & 1 \end{bmatrix} \begin{bmatrix} f_0 \\ f_1 \\ f_2 \end{bmatrix}. \quad (38)$$

Transforming the plurality of sub-tensors to obtain winograd transformation results of the plurality of sub-tensors may be expressed as shown in a formula (39):

$$f_0 : f_0 * \begin{bmatrix} 1 \\ 0 \end{bmatrix}, \ f_1 : f_1 * \begin{bmatrix} 1 \\ 1 \end{bmatrix}, \ , \ f_3 : f_3 * \begin{bmatrix} 0 \\ 1 \end{bmatrix}. \quad (39)$$

Due to the winograd convolution inverse transformation of the transformed element-wise multiplication matrix, based on the size of the sub-tensors, the number of the clocks used to calculate the summation result is determined as $3 \times 1 = 3$. The number of the additions executions required is: $1*2 + 2*2*1 = 2$.

$1*2$ means that the number of the matrixes that are formed by the winograd transformation results of the sub-tensors with only 1 non-zero element is 2; $2*1$ means that the number of the matrixes that are formed by the winograd transformation results of the sub-tensors with 2 non-zero elements is 1; and $2*1$ is the size of the result matrix.

The number of the operation sub-apparatuses is determined as 4 according to the number of the clocks and the number of the addition executions required. The 4 operation sub-apparatuses are numbered 0-3.

Since there are 2 element positions in the result matrix that may be mapped one-to-one with the 2 operation sub-apparatuses, according to this mapping relationship, the addition execution tasks used to calculate each element in the result matrix may be distributed to the 2 operation sub-apparatuses, and the 2 operation sub-apparatuses may complete the addition calculations of each element in the result matrix within the 3 clocks. It is not necessary to plan the input order of the matrixes that are formed by the winograd transformation results of the sub-tensors, and the matrixes that are formed by the winograd transformation results of the sub-tensors are sequentially input: $f_{00} \rightarrow f_{01} \rightarrow f_{02}$.

Figure 5:
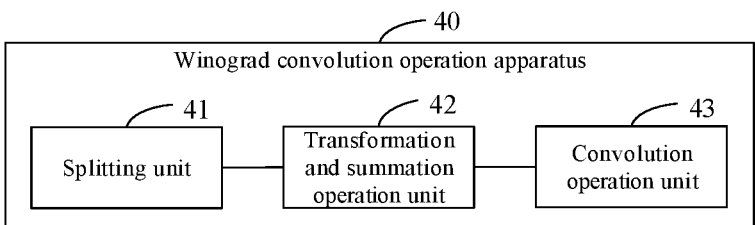
FIG. 5 is a schematic structural diagram of a winograd convolution operation apparatus, according to a first embodiment of the present disclosure.

FIG. 5 is a schematic structural diagram of a winograd convolution operation apparatus, according to a first embodiment of the present disclosure. As shown in FIG. 5, a winograd convolution operation apparatus 40 of this embodiment includes: a splitting unit 41, a transformation and summation operation unit 42 and a convolution operation unit 43.

The splitting unit 41 is configured to split data in a winograd convolution operation into a plurality of sub-tensors during a transformation process of the winograd convolution operation.

The transformation and summation unit 42 is configured to transform the plurality of sub-tensors to obtain winograd transformation results of the plurality of sub-tensors and sum the winograd transformation results of the plurality of sub-tensors to obtain a winograd transformation result of the data, where a summation operation of the winograd transformation results of the plurality of sub-tensors is completed by a plurality of operation sub-apparatuses based on set strategies.

The convolution operation unit 43 is configured to complete the winograd convolution operation according to the winograd transformation result of the data.

The winograd convolution operation apparatus of this embodiment may perform technical solutions of the method embodiment shown in FIG. 2 with similar implementation principles and technical effects, which will not be repeated here.

Figure 6:
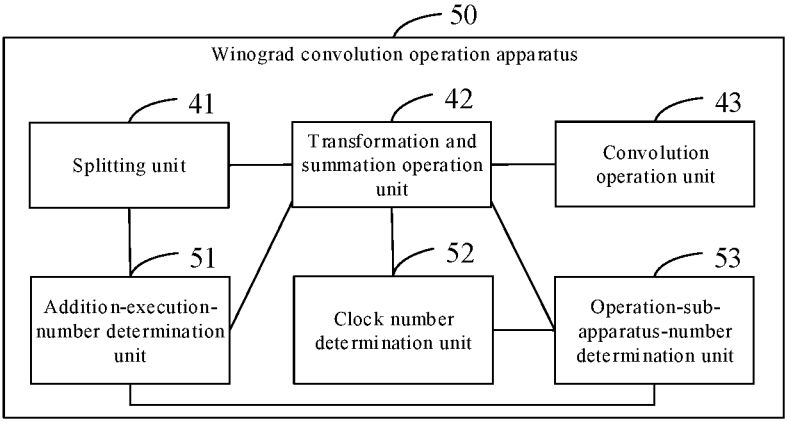
FIG. 6 is a schematic structural diagram of a winograd convolution operation apparatus, according to a second embodiment of the present disclosure.

FIG. 6 is a schematic structural diagram of a winograd convolution operation apparatus, according to a second embodiment of the present disclosure. As shown in FIG. 6, a winograd convolution operation apparatus 50 of this embodiment includes the following technical solutions based on the winograd convolution operation apparatus 40 of the embodiment shown in FIG. 5.

Further, a transformation and summation operation unit 42 is specifically configured to:

during a summation operation of winograd transformation results of a plurality of sub-tensors, distribute the summation operation of the winograd transformation results of the plurality of sub-tensors to a plurality of operation sub-apparatuses for an execution based on a principle of balancing loads of the plurality of operation sub-apparatuses.

Further, a transformation and summation operation unit 42, when the summation operation of the winograd transformation results of the plurality of sub-tensors is distributed to the plurality of operation sub-apparatuses for the execution based on the principle of balancing the loads of the plurality of operation sub-apparatuses, is specifically configured to:

determine the number of non-zero elements in each transformation matrix corresponding to each sub-tensor; determine an order of the winograd transformation results of the plurality of sub-tensors in the summation operation according to the number of the non-zero elements; and distribute addition execution tasks to the plurality of operation sub-apparatuses correspondingly according to the determined order of the winograd transformation results of the plurality of sub-tensors in the summation operation and a preset mapping relationship between element positions in a result matrix and operation sub-apparatuses.

The addition execution tasks are used to calculate elements in the result matrix, and additive numbers in the addition execution tasks of the elements in the result matrix are composed of non-zero element values in data that is formed by the winograd transformation results of the plurality of sub-tensors, and the summation operation at a same element position in the result matrix is performed by a same operation sub-apparatus.

Further, the transformation and summation operation unit 42 also includes: an addition-execution-number determination unit 51, a clock number determination unit 52 and an operation-sub-apparatus-number determination unit 53.

The addition-execution-number determination unit 51 is configured to determine the number of addition executions required for the summation operation according to the winograd transformation results of the plurality of sub-tensors. The clock number determination unit 52 is configured to determine the number of clocks according to a size of the sub-tensors or the result matrix. The operation-sub-apparatus-number determination unit 53 is configured to determine the number of the operation sub-apparatuses according to the number of the clocks and the number of the addition executions required for the summation operation.

Further, the transformation and summation operation unit 42, when the summation operation of the winograd transformation results of the plurality of sub-tensors is distributed to the plurality of operation sub-apparatuses for the execution based on the principle of balancing the loads of the plurality of operation sub-apparatuses, is specifically configure to:

distribute the addition execution tasks to the plurality of operation sub-apparatuses correspondingly according to the determined order of the winograd transformation results of the plurality of sub-tensors in the summation operation and the preset mapping relationship between the element positions in the result matrix and the operation sub-apparatuses, so as to complete addition calculations of the elements in the result matrix within the number of the clocks, where the addition execution tasks are used to calculate the elements in the result matrix.

Optionally, the transformation and summation unit 42, when the addition execution tasks used to calculate the elements in the result matrix are distributed to the plurality of operation sub-apparatuses correspondingly to complete the addition calculations of each element in the result matrix within the preset number of the clocks, is specifically configured to:

input, within first N consecutive clocks, one of additive numbers used to calculate each element position in the result matrix to a corresponding operation sub-apparatus to perform an initial assignment on each element in the result matrix; and input, within remaining clocks, remaining additive numbers used to calculate each element position in the result matrix to corresponding operation sub-apparatuses to perform the addition calculations until each element value in the result matrix is obtained, where all operation sub-apparatuses are in a processing state within each clock.

Optionally, the transformation and summation unit 42, when the addition execution task used to calculate the elements in the result matrix are distributed to the plurality of the operation sub-apparatuses correspondingly to complete the addition calculations of the elements in the result matrix within the preset number of the clocks, is specifically configured to:

divide the number of the clocks into a plurality of clock segments and divide each element position in the result matrix into a plurality of element position sets, where the clock segments correspond to the element position sets one to one; for each element position set, within a first clock of a corresponding clock segment, input one of the additive numbers used to calculate all element positions in the element position set to the corresponding operation sub-apparatus to perform the initial assignment on each element position in the element position set; and within remaining clocks of the clock segment, input remaining additive numbers used to calculate all element positions in the element position set to the corresponding operation sub-apparatuses to perform the addition calculations until each element value in the element position set is obtained, where all operation sub-apparatuses are in the processing state within each clock.

Further, a splitting unit 41 is specifically configured to:

parse the data to obtain the plurality of sub-tensors, where the data is a sum of the plurality of sub-tensors, and the number of the plurality of sub-tensors is the same as the number of the non-zero elements in the data, and each of the sub-tensors has a single non-zero element, and the non-zero elements in the sub-tensors are the same as the non-zero elements in corresponding positions in the data.

Further, the transformation and summation operation unit 42, when the plurality of sub-tensors are transformed to obtain the winograd transformation results of the plurality of sub-tensors, is specifically configured to:

obtain a winograd transformation result of a meta-tensor corresponding to each sub-tensor, where the meta-tensor is a tensor that sets a non-zero element of a sub-tensor as 1; set a non-zero element value of the sub-tensor as a coefficient to be multiplied by the winograd transformation result of a corresponding meta-tensor to obtain a winograd transformation result of the sub-tensor; and sum the winograd transformation results of the plurality of sub-tensors to obtain a winograd transformation result of the data.

Further, the transformation and summation operation unit 42, when the winograd transformation result of the meta-tensor corresponding to each sub-tensor is obtained, is specifically configured to:

for each sub-tensor, multiply a left side of the meta-tensor corresponding to the sub-tensor by a left multiplication matrix and a right side by a right multiplication matrix to obtain the winograd transformation result of the meta-tensor, where both the left multiplication matrix and the right multiplication matrix are determined by a size of the sub-tensor and a type of winograd transformation, where the type of winograd transformation includes a winograd forward transformation and a winograd inverse transformation.

Further, the clock number determination unit 52 is specifically configured to:

determine a maximum size of the sub-tensors and the result matrix; and determine the number of the clocks according to the maximum size.

Further, the operation-sub-apparatus-number determination unit 53 is specifically configured to:

calculate a ratio of the number of the addition executions required to calculate a summation result to the number of the clocks used to calculate the summation result;

and determine the number of the operation sub-apparatuses according to the ratio, where the number of the operation sub-apparatuses is greater than the ratio.

Further, the addition-execution-number determination unit 51 is specifically configured to:

determine the non-zero element value at the same element position in data that is formed by a winograd transformation result of each sub-tensor as an additive number of the element position in the result matrix; determine the number of summation operations at each element position according to the additive number of each element position in the result matrix; and determine a sum of the number of the summation operations at each element position as the number of the addition executions required to calculate the summation result.

Further, in this embodiment, the type of winograd transformation is the winograd forward transformation, and the data is a neuron matrix or a weight matrix; or the type of winograd transformation is the winograd inverse transformation, and the data is a transformed element-wise multiplication matrix, where the transformed element-wise multiplication matrix is a neuron-transformed matrix multiplied with a weight-transformed matrix in an element-wise manner.

The winograd convolution operation apparatus of this embodiment may perform technical solutions of the method embodiments shown in FIGS. 3 to 4 with similar implementation principles and technical effects, which will not be repeated here.

Optionally, the winograd convolution operation apparatus of this embodiment may be applied to a master processor and a slave processor of a master-slave structure.

Figure 7:
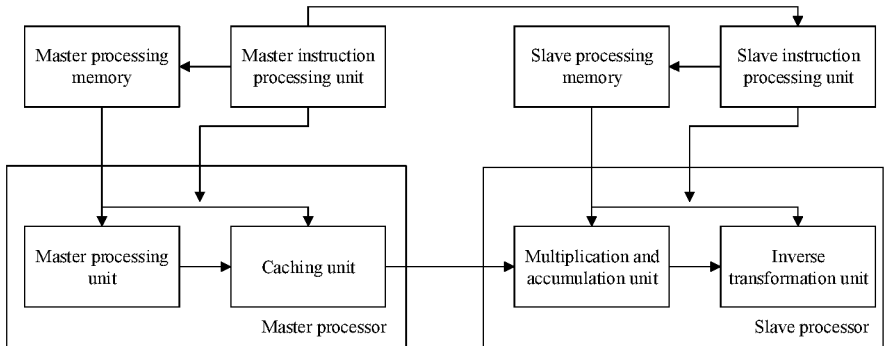
FIG. 7 is a master-slave structure diagram of a winograd convolution operation apparatus, according to a third embodiment of the present disclosure.

Specifically, as shown in FIG. 7, if a winograd convolution forward transformation is performed, a plurality of operation sub-apparatuses are included in a master processing unit, and the plurality of operation sub-apparatuses are capable of performing winograd convolution forward transformations of a neuron matrix and a weight matrix. If a winograd convolution inverse transformation is performed, the plurality of operation sub-apparatuses are included in an inverse transformation unit in a slave processor.

An embodiment of the present disclosure also provides a winograd convolution operation apparatus, including: processors and a memory.

The memory is configured to store a program code. The processors are configured to call the program code stored in the memory and execute the winograd convolution operation method of the embodiment shown in FIG. 2 or the winograd convolution operation method of the embodiments shown in FIGS. 3 to 4.

Relevant explanations may be understood according to relevant descriptions and technical effects corresponding to steps of FIGS. 3 to 4, which will not be repeated here.

In this embodiment, the memory and the processors are connected through a bus.

An embodiment of the present disclosure also provides a computer-readable storage medium, on which an instruction is stored, where when run on a computer, the instruction enables the computer to execute the winograd convolution operation method of the embodiment shown in FIG. 2 or the winograd convolution operation method of the embodiments shown in FIGS. 3 to 4.

The winograd convolution operation method of the embodiments of the present disclosure may be applied to any one processor of a processing system (for example, an artificial intelligence chip) that includes a plurality of processors (a plurality of cores). The processor may be a general-purpose processor, such as a central processing unit (CPU) or an intelligence processing unit (IPU) for performing artificial intelligence operations. The artificial intelligence operations may include machine learning operations, brain-like operations, and the like. The machine learning operations may include a neural network operation, a k-means operation, a support vector machine operation, and the like. The IPU may include one or one combination of, for example, a graphics processing unit (GPU), a neural-network processing unit (NPU), a digital signal processor (DSP), and a field-programmable gate array (FPGA). The present disclosure does not limit a specific type of the processor. In addition, the plurality of processors in the processing system may be of the same or different types, which is not limited by the present disclosure.

In a possible implementation, the processors of the present disclosure may include a plurality of processing units, and each processing unit may independently execute various assigned tasks, such as a convolution operation task, a pooling task, or a fully-connected task, and the like. The present disclosure does not limit the processing unit and the tasks executed by the processing unit.

Figure 8:
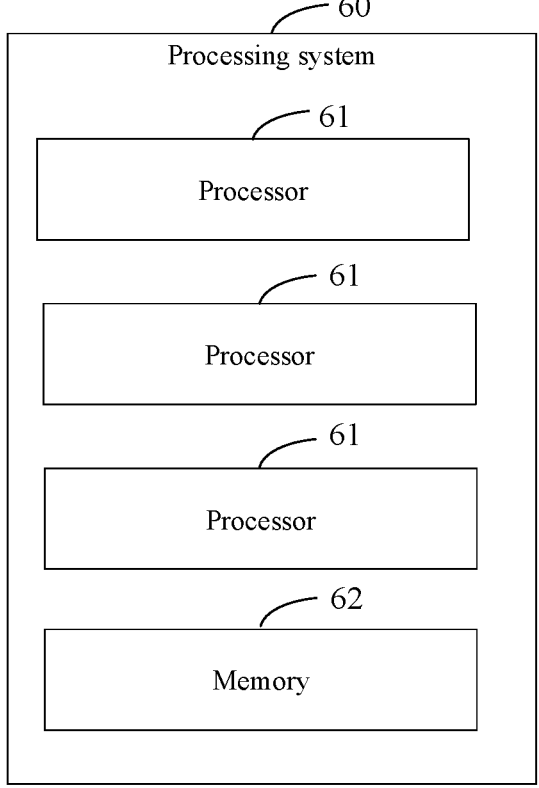
FIG. 8 is a diagram of a processing system of a winograd convolution operation method, according to an embodiment of the present disclosure.

FIG. 8 is a diagram of a processing system of a winograd convolution operation method, according to an embodiment of the present disclosure. As shown in FIG. 8, a processing system 60 may include a plurality of processors 61 and a memory 62. The plurality of processors 61 is used for executing instruction sequences. The memory 62 is used for storing data, which may include a random access memory (RAM) and a register file. The plurality of processors 61 in the processing system 60 may share some of storage space, for example, the plurality of processors 61 in the processing system 60 may share some of storage space of the RAM and the register file, and may also have their own storage spaces at the same time.

It should be noted that, the foregoing method embodiments, for the sake of conciseness, are all described as a series of combinations of actions, but those skilled in the art should know that the present disclosure is not limited by a described order of action since steps may be performed in a different order or simultaneously according to the present disclosure. Secondly, those skilled in the art should also understand that the embodiments described in the specification are all optional, and the actions and modules involved are not necessarily required for this disclosure.

It should be further noted that although the steps in the flowchart are shown sequentially as indicated by arrows, the steps are not necessarily executed sequentially in an order indicated by the arrows. Except as expressly stated herein, there is no strict order in which these steps are performed, and the steps may be performed in other orders. Moreover, at least some of the steps in the flowchart may include a plurality of sub-steps or a plurality of phases, which are not necessarily executed at the same time, but may be executed at different times. These sub-steps or phases are not necessarily executed in a sequential order, but may be executed alternately with other steps or alternately with at least some of the sub-steps or phases of other steps.

It should be understood that the foregoing device embodiments are only illustrative, and the device of the present disclosure may also be implemented in other ways. For example, a division of units/modules in the foregoing embodiment is only a logical function division, and there may be other division methods in actual implementations. For example, a plurality of units, modules, or components may be combined or integrated into another system, or some features may be omitted or may not be implemented.

In addition, unless otherwise specified, functional units/modules in various embodiments of the present disclosure may be integrated into one unit/module. Alternatively, each unit/module may exist alone physically. Alternatively, two or more units/modules may be integrated together. The integrated units/modules may be implemented in the form of hardware or in the form of software program modules.

If the integrated units/modules are implemented in the form of hardware, the hardware may be a digital circuit, an analog circuit, and the like. Physical implementations of a hardware structure include, but are not limited to, a transistor, a memristor, and the like. Unless otherwise specified, an artificial intelligence processor may be any suitable hardware processor, such as a central processing unit (CPU), a graphics processing unit (GPU), a field-programmable gate array (FPGA), a digital signal processor (DSP), an application-specific integrated circuit (ASIC), and the like. Unless otherwise specified, a storage unit may be any suitable magnetic storage medium or magneto-optical storage medium, such as a resistive random access memory (RRAM), a dynamic random access memory (DRAM), a static random access memory (SRAM), an enhanced dynamic random access memory (EDRAM), a high-bandwidth memory (HBM), a hybrid memory cube (HMC), and the like.

If the integrated units/modules are implemented in the form of software program modules and sold or used as an independent product, the integrated units/modules may be stored in a computer-readable memory. Based on such understanding, the essence of technical solutions of the present disclosure, or a part of the present disclosure that contributes to the prior art, or all or part of the technical solutions of the present disclosure maybe embodied in the form of a software product. The software product is stored in a memory and includes several instructions to be used to enable a computer device (which may be a personal computer, a server, or a network device, and the like) to perform all or part of the steps of the method of the embodiments of the present disclosure. The foregoing memory includes: a USB flash drive, a read-only memory (ROM), a RAM, a mobile hard disk, a magnetic disk, or an optical disc, and other media that may store program codes.

In a possible implementation, an artificial intelligence chip is disclosed. The artificial intelligence chip includes the winograd convolution operation apparatus above.

In a possible implementation a board card is disclosed. The board card includes a storage component, an interface apparatus, a control component, and the artificial intelligence chip above. The artificial intelligence chip is connected to the storage component, the control component, and the interface apparatus, respectively; the storage component is configured to store data; the interface apparatus is configured to implement data transfer between the artificial intelligence chip and an external device; and the control component is configured to monitor a state of the artificial intelligence chip.

Figure 9:
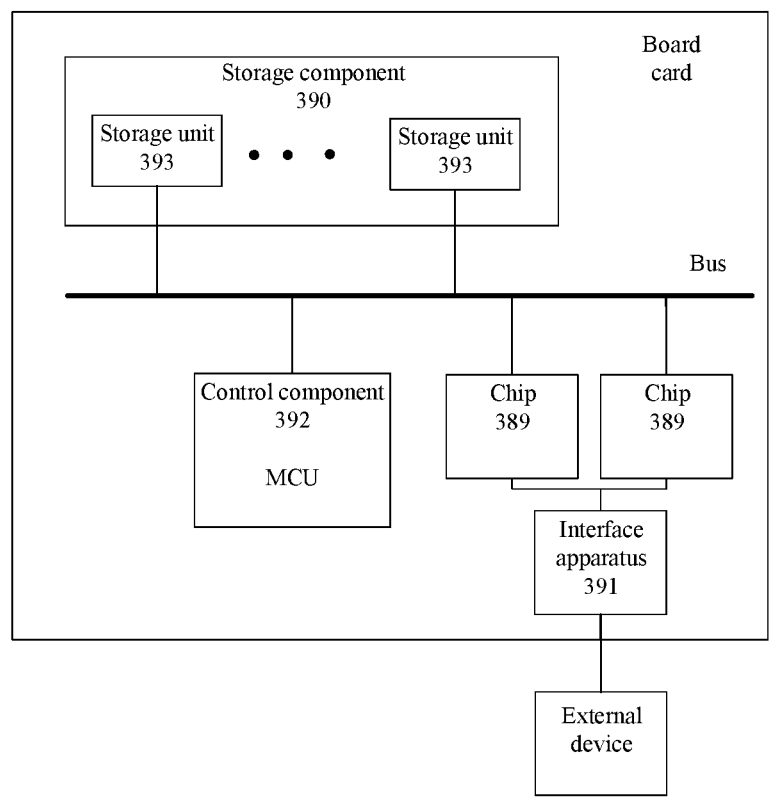
FIG. 9 is a structural block diagram of a board card, according to an embodiment of the present disclosure.

FIG. 9 is a structural block diagram of a board card, according to an embodiment of the present disclosure. Referring to FIG. 9, the board card may include other supporting components in addition to chips 389. The supporting components include but are not limited to: a storage component 390, an interface apparatus 391 and a control component 392.

The storage component 390 is connected to an artificial intelligence chip through a bus and is configured to store data. The storage component may include a plurality of groups of storage units 393. Each group of storage units is connected to the artificial intelligence chip through the bus. It may be understood that each group of the storage units may be a double data rate (DDR) synchronous dynamic random access memory (SDRAM).

The DDR may double a speed of the SDRAM without increasing clock frequency. The DDR may allow data to be read on rising and falling edges of a clock pulse. A speed of the DDR is twice as that of a standard SDRAM. In an embodiment, a storage apparatus may include 4 groups of storage units. Each group of storage units may include a plurality of DDR4 particles (chips). In an embodiment, the artificial intelligence chip may include four 72-bit DDR4 controllers inside, where 64 bits are used for data transfer and 8 bits for an error checking and correcting (ECC) parity. It may be understood that when each group of storage units adopts DDR4-3200 particles, a theoretical bandwidth of the data transfer may reach 25600 MB/s.

In an embodiment, each group of storage units may include a plurality of DDR SDRAMs arranged in parallel. The DDR may transfer data twice per clock cycle. A DDR controller may be arranged inside the chip for controlling the data transfer and data storage of each storage unit.

The interface apparatus may be electrically connected to the artificial intelligence chip. The interface apparatus is configured to realize the data transfer between the artificial intelligence chip and an external device (such as a server or a computer). For example, in an embodiment, the interface apparatus may be a standard peripheral component interconnect express (PCIe) interface. For instance, data to be processed may be transferred by the server through the standard PCIe interface to the chip, thereby realizing the data transfer. In some embodiments, the theoretical bandwidth may reach 16,000 MB/s if a PCIE 3.0×16 interface is used for the data transfer. In another embodiment, the interface apparatus may also be other interfaces. The present disclosure does not restrict specific forms of the other interfaces as long as an interface unit may realize a transferring function. In addition, a calculation result of the artificial intelligence chip may still be transferred to the external device (such as the server) by the interface apparatus.

The control component is electrically connected to the artificial intelligence chip. The control component is configured to monitor a state of the artificial intelligence chip. Specifically, the artificial intelligence chip and the control component may be electrically connected through a serial peripheral interface (SPI). The control component may include a micro controller unit (MCU). If the artificial intelligence chip may include a plurality of processing chips, a plurality of processing cores, or a plurality of processing circuits, the chip is capable of driving a plurality of loads. Therefore, the artificial intelligence chip may be in different working states, such as a multi-load state and a light-load state. Through the control component, regulation and control of the working states of the plurality of processing chips, the plurality of processing cores, or the plurality of processing circuits may be realized.

In a possible implementation, an electronic device is disclosed. The electronic device includes the artificial intelligence chip above. The electronic device may include a data processing device, a robot, a computer, a printer, a scanner, a tablet, a smart terminal, a mobile phone, a traffic recorder, a navigator, a sensor, a webcam, a server, a cloud server, a camera, a video camera, a projector, a watch, a headphone, a mobile storage, a wearable device, a vehicle, a household appliance, and/or a medical device.

The vehicle may include an airplane, a ship, and/or a car; the household appliance may include a television, an air conditioner, a microwave oven, a refrigerator, an electric rice cooker, a humidifier, a washing machine, an electric lamp, a gas cooker, and a range hood; and the medical device may include a nuclear magnetic resonance spectrometer, a B-ultrasonic scanner, and/or an electrocardiograph.

In the embodiments above, the description of each embodiment has its own emphasis. For a part that is not described in detail in one embodiment, reference may be made to related descriptions in other embodiments. Technical features of the embodiments above may be randomly combined. For the sake of conciseness, not all possible combinations of the technical features of the embodiments above are described. Yet, provided that there is no contradiction, combinations of these technical features fall within the scope of the description of the present specification.

The foregoing may be better understood according to the following articles:

A1.

A winograd convolution operation method, comprising:

splitting data in a winograd convolution operation into a plurality of sub-tensors during a transformation process of the winograd convolution operation;

transforming the plurality of sub-tensors to obtain winograd transformation results of the plurality of sub-tensors and summing the winograd transformation results of the plurality of sub-tensors to obtain a winograd transformation result of the data, wherein a summation operation of the winograd transformation results of the plurality of sub-tensors is completed by a plurality of operation sub-apparatuses based on set strategies; and completing the winograd convolution operation according to the winograd transformation result of the data.

A2.

The method of A1, wherein completing the summation operation of the winograd transformation results of the plurality of sub-tensors by the plurality of operation sub-apparatuses based on the set strategies includes:

during the summation operation of the winograd transformation results of the plurality of sub-tensors, distributing the summation operation of the winograd transformation results of the plurality of sub-tensors to the plurality of operation sub-apparatuses for an execution based on a principle of balancing loads of the plurality of operation sub-apparatuses.

A3.

The method of A2, wherein distributing the summation operation of the winograd transformation results of the plurality of sub-tensors to the plurality of operation sub-apparatuses for the execution based on the principle of balancing the loads of the plurality of operation sub-apparatuses includes:

determining the number of non-zero elements in each transformation matrix corresponding to each sub-tensor;

determining an order of the winograd transformation results of the plurality of sub-tensors in the summation operation according to the number of the non-zero elements; and distributing addition execution tasks to the plurality of operation sub-apparatuses correspondingly according to a determined order of the winograd transformation results of the plurality of sub-tensors in the summation operation and a preset mapping relationship between element positions in a result matrix and operation sub-apparatuses, wherein the addition execution tasks are used to calculate each element in the result matrix, and additive numbers in the addition execution tasks of each element in the result matrix are composed of non-zero element values in data that is formed by the winograd transformation results of the plurality of sub-tensors, wherein the summation operation at a same element position in the result matrix is performed by a same operation sub-apparatus.

A4.

The method of A3, wherein before distributing the summation operation of the winograd transformation results of the plurality of sub-tensors to the plurality of operation sub-apparatuses for the execution based on the principle of balancing the loads of the plurality of operation sub-apparatuses, the method further comprises:

determining the number of addition executions required for the summation operation according to the winograd transformation results of the plurality of sub-tensors;

determining the number of clocks according to a size of the sub-tensors or the result matrix; and determining the number of the operation sub-apparatuses according to the number of the clocks and the number of the addition executions required for the summation operation.

A5.

The method of A4, wherein distributing the summation operation of the winograd transformation results of the plurality of sub-tensors to the plurality of operation sub-apparatuses for the execution based on the principle of balancing the loads of the plurality of operation sub-apparatuses includes:

distributing the addition execution tasks to the plurality of operation sub-apparatuses correspondingly according to the determined order of the winograd transformation results of the plurality of sub-tensors in the summation operation and the preset mapping relationship between the element positions in the result matrix and the operation sub-apparatuses, so as to complete addition calculations of each element in the result matrix within the number of the clocks.

A6.

The method of A5, wherein distributing the addition execution tasks to the plurality of operation sub-apparatuses correspondingly to complete the addition calculations of each element in the result matrix within the preset number of the clocks includes:

inputting, within first N consecutive clocks, one of additive numbers used to calculate each element position in the result matrix to a corresponding operation sub-apparatus to perform an initial assignment on each element in the result matrix; and inputting, within remaining clocks, remaining additive numbers used to calculate each element position in the result matrix to corresponding operation sub-apparatuses to perform the addition calculations until each element value in the result matrix is obtained, wherein all operation sub-apparatuses are in a processing state within each clock.

A7.

The method of A5, wherein distributing the addition execution tasks to the plurality of operation sub-apparatuses correspondingly to complete the addition calculations of each element in the result matrix within the preset number of the clocks includes:

dividing the number of the clocks into a plurality of clock segments and dividing each element position in the result matrix into a plurality of element position sets, wherein the clock segments correspond to the element position sets one to one;

for each element position set, within a first clock of a corresponding clock segment, inputting one of additive numbers used to calculate all element positions in the element position set to a corresponding operation sub-apparatus to perform an initial assignment on each element position in the element position set; and within remaining clocks of the clock segment, inputting remaining additive numbers used to calculate all element positions in each element position set to corresponding operation sub-apparatuses to perform the addition calculations until each element value in the element position set is obtained, wherein all operation sub-apparatuses are in a processing state within each clock.

A8.

The method of any one of A1-A7, wherein splitting the data in the winograd convolution operation into the plurality of sub-tensors includes:

parsing the data to obtain the plurality of sub-tensors, wherein the data is a sum of the plurality of sub-tensors, the number of the plurality of sub-tensors is the same as the number of the non-zero elements in the data, each of the sub-tensors has a single non-zero element, and the non-zero elements in the sub-tensors are the same as the non-zero elements in corresponding positions in the data.

A9.

The method of any one of A1-A8, wherein transforming the plurality of sub-tensors to obtain the winograd transformation results of the plurality of sub-tensors includes:

obtaining a winograd transformation result of a meta-tensor corresponding to each sub-tensor, wherein the meta-tensor is a tensor that sets a non-zero element of a sub-tensor as 1;

setting a non-zero element value of the sub-tensor as a coefficient to be multiplied by the winograd transformation result of the meta-tensor corresponding to the sub-tensor to obtain a winograd transformation result of the sub-tensor; and summing the winograd transformation results of the plurality of sub-tensors to obtain the winograd transformation result of the data.

A10.

The method of A9, wherein obtaining the winograd transformation result of the meta-tensor corresponding to each sub-tensor includes:

for each sub-tensor, multiplying a left side of the meta-tensor corresponding to the sub-tensor by a left multiplication matrix and multiplying a right side of the meta-tensor corresponding to the sub-tensor by a right multiplication matrix, so as to obtain the winograd transformation result of the meta-tensor, wherein both the left multiplication matrix and the right multiplication matrix are determined by a size of the sub-tensor and a type of winograd transformation, wherein the type of winograd transformation includes a winograd forward transformation and a winograd inverse transformation.

A11.

The method of any one of A4-A10, wherein determining the number of the clocks according to the size of the sub-tensors or the result matrix includes:

determining a maximum size in the sub-tensors and the result matrix; and determining the number of the clocks according to the maximum size.

A12.

The method of any one of A4-A10, wherein determining the number of the operation sub-apparatuses according to the number of the clocks and the number of the addition executions required to calculate a summation result includes:

calculating a ratio of the number of the addition executions required to calculate the summation result to the number of the clocks used to calculate the summation result; and determining the number of the operation sub-apparatuses according to the ratio, wherein the number of the operation sub-apparatuses is greater than the ratio.

A13.

The method of any one of A4-A12, wherein determining the number of the addition executions required for the summation operation according to the winograd transformation results of the plurality of sub-tensors includes:

determining the non-zero element value at the same element position in data that is formed by a winograd transformation result of each sub-tensor as an additive number of the element position in the result matrix;

determining the number of summation operations at each element position according to the additive number of each element position in the result matrix; and determining a sum of the number of summation operations at each element position as the number of the addition executions required to calculate the summation result.

A14.

The method of any one of A10-A13, wherein the type of winograd transformation is the winograd forward transformation, and the data is a neuron matrix or a weight matrix; or the type of winograd transformation is the winograd inverse transformation, and the data is a transformed element-wise multiplication matrix, wherein the transformed element-wise multiplication matrix is a neuron-transformed matrix multiplied with a weight-transformed matrix in an element-wise manner.

A15.

A winograd convolution operation apparatus, comprising:

a splitting unit configured to split data in a winograd convolution operation into a plurality of sub-tensors during a transformation process of the winograd convolution operation;

a transformation and summation operation unit configured to transform the plurality of sub-tensors to obtain winograd transformation results of the plurality of sub-tensors and sum the winograd transformation results of the plurality of sub-tensors to obtain a wino-
grad transformation result of the data, wherein a sum-
mation operation of the winograd transformation
results of the plurality of sub-tensors is completed by a
plurality of operation sub-apparatuses based on set
strategies; and
a convolution operation unit configured to complete the
winograd convolution operation according to the wino-
grad transformation result of the data.
A16.
The apparatus of A15, wherein the winograd convolution
operation apparatus is applied to a master processor or a
slave processor of a master-slave structure.
A17.
A winograd convolution operation apparatus, comprising
processors and a memory, wherein
the memory is configured to store a program code; and
the processors are configured to call the program code
stored in the memory and execute the method of any
one of A1-A14.
A18.
A computer-readable storage medium, on which an
instruction is stored, wherein when run on a computer, the
instruction enables the computer to execute the method of
any one of A1-14.
A19.
An artificial intelligence chip, comprising the winograd
convolution operation apparatus of any one of A1-A17.
A20.
An electronic device, comprising the artificial intelligence
chip of A19.
A21.
A board card, comprising a storage component, an inter-
face apparatus, a control component and the artificial intelligence chip of A19, wherein
the artificial intelligence chip is connected to the storage
component, the control component, and the interface
apparatus, respectively;
the storage component is configured to store data;
the interface apparatus is configured to implement data
transfer between the artificial intelligence chip and an
external device; and
the control component is configured to monitor a state of
the artificial intelligence chip.
A22.
The board card of A21, wherein the storage component
includes: a plurality of groups of storage units, where each
of the groups of storage units is connected to the artificial
intelligence chip through a bus, and a storage unit is a double
data rate (DDR) synchronous dynamic random access
memory (SDRAM);
the chip includes: a DDR controller configured to control
data transfer and data storage of each storage unit; and
the interface apparatus is a standard peripheral component
interconnect express (PCIe) interface.
The above describes the embodiments of the present
disclosure in detail. Specific examples are applied in this
present disclosure to illustrate principles and implementa-
tions of the present disclosure. The aforementioned embodiments are described only to help understand the method and
core ideas of the present disclosure. Simultaneously, persons
of ordinary skill in the art may change or transform the
specific implementations and application scope of the pres-
ent disclosure according to the ideas of the present disclosure. The changes and transformations shall all fall within
the protection scope of the present disclosure. In summary, the content of this specification should not be construed as
a limitation on the present disclosure.

What is claimed:
1. A winograd convolution operation method, comprising:
splitting, by a splitting circuit, data in a winograd con-
volution operation into a plurality of sub-tensors during
a transformation process of the winograd convolution
operation;
obtaining, by a transformation and summation operation
circuit, meta-tensors corresponding to a plurality of
sub-tensors;
executing, by the transformation and summation opera-
tion circuit, winograd transformations of the meta-
tensors;
transforming, by a transformation and summation opera-
tion circuit, the plurality of sub-tensors to obtain wino-
grad transformation results of the plurality of sub-
tensors based on the winograd transformation results of
the meta-tensors;
summing, by the transformation and summation operation
circuit, the winograd transformation results of the plu-
rality of sub-tensors to obtain a winograd transforma-
tion result of the data, wherein
a summation operation of the winograd transformation
results of the plurality of sub-tensors is completed,
by a plurality of operation sub-apparatuses, based on
set strategies that includes distributing, by the trans-
formation and summation operation circuit, the sum-
mation operation of the winograd transformation
results of the plurality of sub-tensors to the plurality
of operation sub-apparatuses for an execution based
on a principle of balancing loads of the plurality of
operation sub-apparatuses, and
the distributing of the summation operation of the
winograd transformation results of the plurality of
sub-tensors to the plurality of operation sub-appara-
tuses for the execution based on the principle of
balancing the loads of the plurality of operation
sub-apparatuses includes:
determining a number of non-zero elements in each
transformation matrix corresponding to each sub-
tensor of the plurality of sub-tensors;
determining an order of the winograd transformation
results of the plurality of sub-tensors in the sum-
mation operation according to the number of the
non-zero elements; and
completing, by a convolution operation circuit, the wino-
grad convolution operation according to the winograd
transformation result of the data.
2. The winograd convolution operation method of claim
1, wherein
the distributing of the summation operation of the wino-
grad transformation results of the plurality of sub-
tensors to the plurality of operation sub-apparatuses for
the execution based on the principle of balancing the
loads of the plurality of operation sub-apparatuses
further includes:
distributing addition execution tasks to the plurality of
operation sub-apparatuses correspondingly accord-
ing to a determined order of the winograd transfor-
mation results of the plurality of sub-tensors in the
summation operation and a preset mapping relation-
ship between element positions in a result matrix and
the plurality of operation sub-apparatuses, wherein
the addition execution tasks are used to calculate
each element in the result matrix, additive numbers in the addition execution tasks of each element in the result matrix are composed of non-zero element values in the data that is formed by the winograd transformation results of the plurality of sub-tensors, and the summation operation at a same element position in the result matrix is performed by a same operation sub-apparatus.

3. The winograd convolution operation method of claim 2, wherein before the distributing of the summation operation of the winograd transformation results of the plurality of sub-tensors to the plurality of operation sub-apparatuses for the execution based on the principle of balancing the loads of the plurality of operation sub-apparatuses, the method further comprises:

determining a number of addition executions required for the summation operation according to the winograd transformation results of the plurality of sub-tensors;

determining a number of clocks according to a size of the plurality of sub-tensors or the result matrix; and determining a number of the operation sub-apparatuses according to the number of the clocks and the number of the addition executions required for the summation operation.

4. The winograd convolution operation method of claim 3, wherein the distributing of the summation operation of the winograd transformation results of the plurality of sub-tensors to the plurality of operation sub-apparatuses for the execution based on the principle of balancing the loads of the plurality of operation sub-apparatuses includes:

distributing the addition execution tasks to the plurality of operation sub-apparatuses correspondingly according to the determined order of the winograd transformation results of the plurality of sub-tensors in the summation operation and the preset mapping relationship between the element positions in the result matrix and the operation sub-apparatuses, so as to complete addition calculations of each element in the result matrix within the number of the clocks.

5. A winograd convolution operation apparatus, comprising:

a splitting circuit configured to split data in a winograd convolution operation into a plurality of sub-tensors during a transformation process of the winograd convolution operation;

a transformation and summation operation circuit configured to:

obtain meta-tensors corresponding to a plurality of sub-tensors;

execute winograd transformations of the meta-tensors;

transform the plurality of sub-tensors to obtain winograd transformation results of the plurality of sub-tensors and sum the winograd transformation results of the plurality of sub-tensors to obtain a winograd transformation result of the data, wherein a summation operation of the winograd transformation results of the plurality of sub-tensors is completed, by a plurality of operation sub-apparatuses, based on set strategies, that includes during the summation operation of the winograd transformation results of the plurality of sub-tensors, wherein the transformation and summation operation circuit is further configured to distribute the summation operation of the winograd transformation results of the plurality of sub-tensors to the plurality of operation sub-apparatuses for an execution based on a principle of balancing loads of the plurality of operation sub-apparatuses;

when the summation operation of the winograd transformation results of the plurality of sub-tensors is distributed to the plurality of operation sub-apparatuses based on the principle of balancing the loads of the plurality of operation sub-apparatuses, the transformation and summation operation circuit is further configured to:

determine a number of non-zero elements in each transformation matrix corresponding to each sub-tensor of the plurality of sub-tensors;

determine an order of the winograd transformation results of the plurality of sub-tensors in the summation operation according to the number of the non-zero elements; and a convolution operation circuit configured to complete the winograd convolution operation according to the winograd transformation result of the data.

6. The winograd convolution operation apparatus of claim 5, wherein the winograd convolution operation apparatus is applied to a master processor or a slave processor of a master-slave structure.

7. The winograd convolution operation apparatus of claim 5, wherein when the summation operation of the winograd transformation results of the plurality of sub-tensors is distributed to the plurality of operation sub-apparatuses based on the principle of balancing the loads of the plurality of operation sub-apparatuses, the transformation and summation operation circuit is further configured to:

distribute addition execution tasks to the plurality of operation sub-apparatuses correspondingly according to a determined order of the winograd transformation results of the plurality of sub-tensors in the summation operation and a preset mapping relationship between element positions in a result matrix and operation sub-apparatuses, wherein the addition execution tasks are used to calculate each element in the result matrix, additive numbers in the addition execution tasks of each element in the result matrix are composed of non-zero element values in the data that is formed by the winograd transformation results of the plurality of sub-tensors, and the summation operation at a same element position in the result matrix is performed by a same operation sub-apparatus.

8. The winograd convolution operation apparatus of claim 7, further comprising:

an addition-execution-number determination circuit configured to determine a number of addition executions required for the summation operation according to the winograd transformation results of the plurality of sub-tensors;

a clock number determination circuit configured to determine a number of clocks according to a size of the plurality of sub-tensors or the result matrix; and an operation-sub-apparatus-number determination circuit configured to determine a number of the operation sub-apparatuses according to the number of the clocks and the number of the addition executions required for the summation operation.

9. The winograd convolution operation apparatus of claim 8, wherein the clock number determination circuit is specifically configured to:

determine a maximum size in the sub-tensors and the result matrix; and determine the number of the clocks according to the maximum size.

10. The winograd convolution operation apparatus of claim 8, wherein the operation-sub-apparatus-number determination circuit is specifically configured to:

calculate a ratio of the number of the addition executions required to calculate a summation result to the number of the clocks used to calculate the summation result; and determine the number of the operation sub-apparatuses according to the ratio, wherein the number of the operation sub-apparatuses is greater than the ratio.

11. The winograd convolution operation apparatus of claim 8, wherein the addition-execution-number determination circuit is specifically configured to:

determine a non-zero element value at the same element position in data that is formed by a winograd transformation result of each sub-tensor as an additive number of the element position in the result matrix;

determine the number of summation operations at each element position according to the additive number of each element position in the result matrix; and determine a sum of the number of summation operations at each element position as the number of the addition executions required to calculate a summation result.

12. The winograd convolution operation apparatus of claim 5, wherein when the addition execution tasks used to calculate each element in the result matrix are distributed to the plurality of the operation sub-apparatuses correspondingly to complete the addition calculations of each element in the result matrix within a preset number of the clocks, the transformation and summation operation circuit is specifically configured to:

input, within first N consecutive clocks, one of additive numbers used to calculate each element position in the result matrix to a corresponding operation sub-apparatus to perform an initial assignment on each element in the result matrix; and input, within remaining clocks, remaining additive numbers used to calculate each element position in the result matrix to corresponding operation sub-apparatuses to perform the addition calculations until each element value in the result matrix is obtained, wherein all operation sub-apparatuses are in a processing state within each clock.

13. The winograd convolution operation apparatus of claim 5, wherein when the addition execution tasks used to calculate each element in the result matrix are distributed to the plurality of operation sub-apparatuses correspondingly to complete the addition calculations of each element in the result matrix within a preset number of the clocks, the transformation and summation operation circuit is specifically configured to:

divide the number of the clocks into a plurality of clock segments and divide each element position in the result matrix into a plurality of element position sets, wherein the clock segments correspond to the element position sets one to one;

for each element position set, within a first clock of a corresponding clock segment, input one of additive numbers used to calculate all element positions in the element position set to a corresponding operation sub-apparatus to perform an initial assignment on each element position in the element position set; and within remaining clocks of the clock segment, input remaining additive numbers used to calculate all element positions in each element position set to corresponding operation sub-apparatuses to perform the addition calculations until each element value in the element position set is obtained, wherein all operation sub-apparatuses are in a processing state within each clock.

14. The winograd convolution operation apparatus of claim 5, wherein the splitting circuit is further configured to parse the data to obtain the plurality of sub-tensors, the data is a sum of the plurality of sub-tensors, a number of the plurality of sub-tensors is the same as a number of non-zero elements in the data, each of the sub-tensors of the plurality of sub-tensors has a single non-zero element, and the non-zero elements in the sub-tensors of the plurality of sub-tensors are the same as the non-zero elements in corresponding positions in the data.

15. The winograd convolution operation apparatus of claim 5, wherein when the plurality of sub-tensors is transformed to obtain the winograd transformation results of the plurality of sub-tensors, the transformation and summation operation circuit is further configured to:

obtain a winograd transformation result of a meta-tensor corresponding to each sub-tensor of the plurality of sub-tensors, wherein the meta-tensor is a tensor that sets a non-zero element of a sub-tensor as 1;

set a non-zero element value of the sub-tensor of the plurality of sub-tensors as a coefficient to be multiplied by the winograd transformation result of the meta-tensor corresponding to the sub-tensor of the plurality of sub-tensors to obtain a winograd transformation result of the sub-tensor; and sum the winograd transformation results of the plurality of sub-tensors to obtain the winograd transformation result of the data.

16. The winograd convolution operation apparatus of claim 15, wherein when the winograd transformation result of the meta-tensor corresponding to each sub-tensor is obtained, the transformation and summation operation circuit is further configured to:

for each sub-tensor of the plurality of sub-tensors, multiply a left side of the meta-tensor corresponding to the sub-tensor of the plurality of sub-tensors by a left multiplication matrix and multiply a right side of the meta-tensor corresponding to the sub-tensor of the plurality of sub-tensors by a right multiplication matrix, so as to obtain the winograd transformation result of the meta-tensor, both the left multiplication matrix and the right multiplication matrix are determined by a size of the sub-tensor and a type of winograd transformation, and the type of winograd transformation includes a winograd forward transformation and a winograd inverse transformation.

* * * * *